United States Patent
Zhu

[11] Patent Number: 5,550,847
[45] Date of Patent: Aug. 27, 1996

[54] DEVICE AND METHOD OF SIGNAL LOSS RECOVERY FOR REALTIME AND/OR INTERACTIVE COMMUNICATIONS

[75] Inventor: Qin-Fan Zhu, Stoughton, Mass.

[73] Assignee: Motorola, Inc., Schaumburg, Ill.

[21] Appl. No.: 320,718

[22] Filed: Oct. 11, 1994

[51] Int. Cl.⁶ ................................................. G08C 25/02
[52] U.S. Cl. ............................................. 371/32; 348/409
[58] Field of Search ............................. 371/32, 33, 34, 371/35; 348/409, 410, 411, 412, 416

[56] References Cited

U.S. PATENT DOCUMENTS

| | | | |
|---|---|---|---|
| 5,103,307 | 4/1992 | Sugiyama | 348/410 |
| 5,117,288 | 5/1992 | Eisenhardt et al. | 358/136 |
| 5,247,363 | 9/1993 | Sun et al. | 358/167 |
| 5,260,783 | 11/1993 | Dixit | 358/136 |
| 5,278,646 | 1/1994 | Civanlar | 348/415 X |
| 5,455,841 | 10/1995 | Hazu | 375/240 |
| 5,479,212 | 12/1995 | Kurobe et al. | 348/409 |

OTHER PUBLICATIONS

Zhang, Y et al.; "Variable-Bit-Rate Video Transmission in the Broadband ISDN Network"; 1990; IEEE.
William Stallings, Ph.D., "Data and Computer Communications", Macmillan Publishing ICompany, New York, 1988, pp. 141–147.
Qin–Fan Zhu, Yao Want, and Leonard Shaw, "Coding and Cell–Loss Recovery in DCT–Based Packet Video", IEEE Transactions on Circuits and Systems for Video Technology, vol., 3, No. 3, Jun. 1993, pp. 248–258.

Primary Examiner—Roy N. Envall, Jr.
Assistant Examiner—Brian C. Oakes
Attorney, Agent, or Firm—Darleen J. Stockley

[57] ABSTRACT

The present invention provides a signal loss recovery device (300; 400; 900) and method (500; 600; 1000; 1100; 1200) of digitally encoded bitstreams produced by predictive encoders, for realtime and/or interactive communications. The signal loss recovery device (300; 400; 900) of this invention recovers the lost or damaged information by requesting the transmitter for retransmitting the lost information. Compared to the previously known retransmission technique, the device in this invention does not introduce any extra buffer delay. The elimination of this buffer delay is realized by continuously processing the received data while waiting for the arrival of the retransmission. The information contained in the retransmitted data is reinserted into the error corrupted signal to restore the output signal to its original form without signal loss.

37 Claims, 9 Drawing Sheets

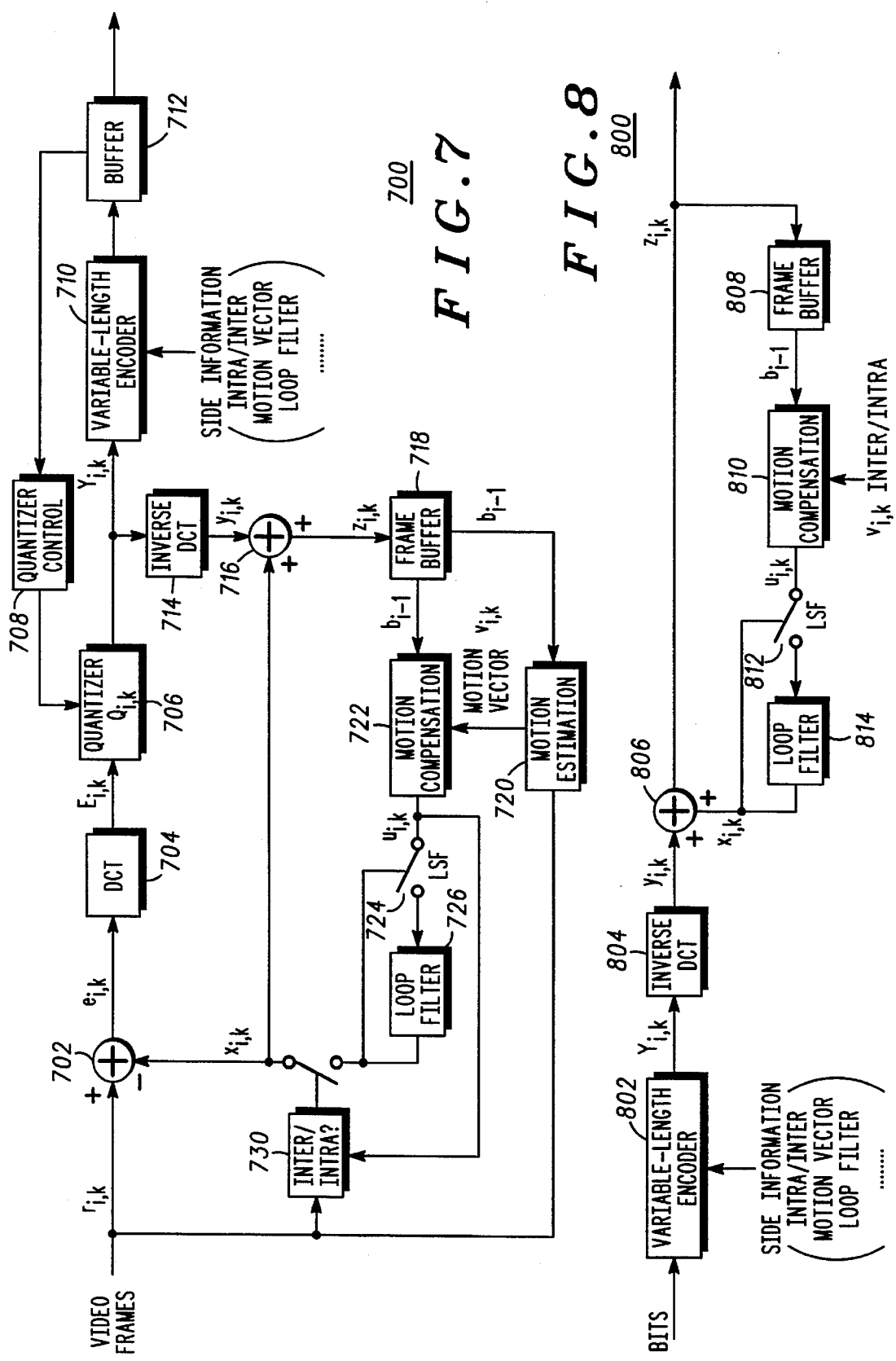

DEVICE AND METHOD OF SIGNAL LOSS RECOVERY FOR REALTIME AND/OR INTERACTIVE COMMUNICATIONS

FIELD OF THE INVENTION

This invention relates generally to signal loss recovery of digitally encoded signals, and more particularly to signal loss recovery of signals that are digitally encoded by predictive coders, for realtime and/or interactive communications.

BACKGROUND

Predictive coding is widely used for compression of digital signals (e.g., speech, image or video) by removing the statistical redundancy among neighboring samples of these waveforms. Several ITU-T Recommendations for speech coding have adopted predictive coding (for example, differential pulse-code modulation, or DPCM, is used in G.721). In these predictive speech coders, an original speech sample is predicted based on past speech samples and the prediction error, which is the difference between the original and the predicted sample, is quantized and encoded. Because the energy of the prediction error signal is much smaller than the original signal, on the average, a high compression ratio can be obtained.

Predictive coding also finds wide applications in image and video coding. In image coding, the value of a pixel can be predicted from its neighboring pixels and the prediction error is quantized and coded. In video applications, a video frame can be predicted from its preceding frames and the prediction error frame is quantized and coded.

State-of-the-art digital video compression systems use a hybrid coding method which reduces the temporal correlation by motion compensated prediction (MCP) and the spatial redundancy by Discrete Cosine Transform (DCT). Two video compression standards are based on this hybrid scheme, which are the ITU-T H.261 and the International Standards Organization's Motion Picture Experts Group (ISO MPEG). In addition, two other international standards being developed are also based on the same scheme. They are the MPEG II and ITU-T H.26p. In this hybrid coding method, a video frame is first segmented into non-overlapping square blocks of size NxN, called macroblocks (MB's), where N is a predetermined integer. For each MB, a replica is searched in the previously decoded frame to find an NxN block which minimizes a predetermined error function. Then this block is used to predict the current MB. The prediction error block and the motion vector, which is defined as the displacement of the position of the prediction block with respect to the original block, are coded and transmitted to the receiver. The prediction error block first undergoes a DCT, and then the transform coefficients are quantized, and losslessly encoded by runlength and entropy coding.

FIG. 1, numeral 100, is a block diagram schematic of a predictive waveform encoder as is known in the art. A sequence of vectors consisting of a group of samples $r_i$ taken from an original waveform are processed to generate a sequence of quantized vectors $Y_i$, where i=0, 1, . . . , is a time index indicating the order in which the input vectors are processed. The dimension L of the input vectors is arbitrary. For typical speech applications, L=1, whereas for most video applications, L>1.

The encoder operates iteratively in the following way: (1) a predictor unit (102) generates a prediction of the input vector $r_i$ represented by the vector xi based on n past reconstructed vectors $Z_{i-n}$, . . . , $Z_{i-1}$, where n is the order of the predictor. For typical speech applications, n>1, whereas for most video applications, n=1; (2) the vector $x_i$ is subtracted from $r_i$ at a first adder (104) to obtain the prediction error vector $e_i = r_i - x_i$, wherein a predictor $P_i$ is typically chosen to minimize the average energy of the prediction error vector $e_i$; (3) the prediction error vector $e_i$ is transformed by a transformation unit (106) according to $E_i = A_i[e_i]$, where $A_i[]$ represents a linear transformation such as DCT; (4) the vector $E_i$ is quantized using a quantizer $Q_i$ (108) to obtain the quantized vector $Y_i$, which is encoded into a binary word using a lossless coder such as a Huffman coder, and then it is transmitted or stored; (5) the quantized vector $Y_i$ is then inverse transformed at the inverse transformation unit $A_i^{-1}$ (110) to obtain the vector $Y_i = A_i^{-1}[Y_i]$, where $A_i^{-1}$ is the inverse transformation of $A_i$ (i.e., $A_i^{-1}[A_i[x]] = x$); (6) the vector $x_i$ is added to $y_i$ by a second adder (112) to obtain the reconstructed vector $z_i = y_i + x_i$; (7) the reconstructed vector $z_i$ is stored in the memory unit $M_i$ (114) for use in later iterations. The capacity of the memory is chosen such that n vectors of dimension L may be stored.

In most applications, the transformation $A_i$ is fixed a priori, i.e., is predetermined, whereas $Q_i$ and $P_i$ are varied using preselected adaptation algorithms. In some applications, the transformation $A_i$ is not used. In such a case, $A_i=1$, where 1 is an LxL identity matrix. In forward adaptation, the parameters of $Q_i$ and $P_i$ are passed to the receiver as side information. On the other hand, in backward adaptation, the parameters are determined at the decoder from previously received information; hence no side information needs to be sent.

Given the information of $Q_i$, $P_i$ and $A_i$, a decoder can reconstruct the vector $z_i$. FIG. 2, numeral 200, is a block diagram schematic of a decoder as is known in the art. It may be viewed as a subset of the corresponding encoder shown in FIG. 1 (100). The decoder (200) first recovers the quantized vector $Y_i$ from the received bitstream and then obtains $Z_i$ in the following way iteratively: (1) the quantized vector $Y_i$ is first inverse transformed using the inverse transformation unit $A_i^{-1}$ (202) to obtain vector $Y_i = A_i^{-1}[Y_i]$; (2) a predictor (206) generates the prediction vector xi from the past n reconstructed vectors, $Z_{i-n}$, . . . , $Z_{i-1}$, using the same predictor $P_i$ as in the encoder; (3) the reconstructed vector $Z_i$ is obtained by summing the two vectors $Y_i$ and $X_i$ by the adder (204); (4) the reconstructed vector $Z_i$ is stored in the memory unit Mi for future iterations. As in the encoder, the memory capacity is chosen to hold n reconstructed vectors of L dimension.

If forward adaptation is used in the encoder, the side information is also decoded and used to assist the operations of inverse quantization and the prediction.

The above decoder will operate perfectly if no error happens in the channel between the encoder and decoder pair. However, any physical channel is never perfect. If any of the information bits are damaged during the transmission, the decoder will have a problem reconstructing the vectors $\{z_i\}$. For example, if the vector $Y_i$ is corrupted, then vector $Y_i$ will also be damaged. Subsequently, $Z_i$ is damaged, which will in turn lead to a wrong prediction vector $X_{i+1}$ for the next iteration, and therefore a damaged $Z_{i+1}$. Because of the prediction loop structure, the error will propagate forever. In order to avoid such devastation, in typical applications, some vectors are chosen to be coded directly, i.e., without using prediction. In this way, the above error propagation will stop when the decoder comes across such directly coded samples. However, such direct coding of samples will likely reduce the compression gain. Therefore, the frequency of use of such directly coded samples has to be low enough so that the sacrifice of compression gain is not significant.

In digital video compression applications, such direct coding is called intraframe coding, or simply intra coding, in contrast to another terminology called interframe coding, which uses the prediction coding as described above. The period between two intra coded frames varies for different applications. In H.261, the maximum of this period is 132 video frames.

Transmission errors can be roughly classified into two categories: random bit errors and erasure errors. A random bit error is caused by the imperfection of physical channels, which results in inversion, insertion or deletion of an information bit. Erasure errors, on the other hand, include such information loss as cell loss in packet switched networks (e.g., Asynchronous Transfer Mode, or ATM, networks) and burst error in storage media due to physical defects. Therefore, a random bit error usually leads to information damage, whereas a erasure error leads to information loss at the receiver. Since Variable Length Coding (VLC, for example, Huffman coding)is usually used to exploit the statistical redundancy among symbols to be transmitted, a single bit error can lead to many following information bits being undecodable, hence useless, until the next synchronization symbol. Therefore, a random bit error in VLC can also be thought of as one kind of erasure error.

The state-of-the-art for information loss protection and recovery include Automatic Repeat request (ARQ), error control coding (ECC) and error concealment. In the ARQ method, the transmitter keeps a copy of the transmitted information with a predetermined memory size. When the receiver detects information damage or loss, it sends a request to the transmitter for retransmission of the damaged/lost portion of information. Although ARQ has been quite successful in data communication, it has generally been thought to be inappropriate for services demanding real-time and/or interactive signal delivery because of the involved delay. ECC combats transmission errors by adding redundancy to the bitstream to be transmitted in a controlled way, such that some of the bit errors can be detected and, in some cases, corrected. While it might be effective to protect against random bit errors, use of ECC to protect erasure errors is extremely difficult, if not impossible. For example, in ATM networks, to protect the loss of a cell containing several hundreds of bits, data interleaving has to be performed and substantial redundancy has to be added. This will not only reduce the compression gain, but will also increase the hardware complexity and processing delay. Finally, error concealment is a technique which tries to conceal the effect of information loss by interpolating the lost samples from the neighboring correctly received samples. The reconstructed signal quality usually depends on the content of the original signal and the complexity of the applied algorithm.

Thus, there is a need for a device and method that provide efficient signal loss recovery for realtime and/or interactive communications.

BRIEF DESCRIPTION OF THE DRAWINGS

FIG. 7 is a block diagram schematic of a hybrid video encoder as is known in the art.

FIG. 8 is a block diagram schematic of a hybrid video decoder that typically operates in conjunction with an encoder of FIG. 7, as is known in the art.

DETAILED DESCRIPTION OF A PREFERRED EMBODIMENT

The device and method of signal loss recovery of the present invention recovers the damaged/lost signal through retransmission. A well-known technique for communication protocol between the transmitter and receiver is the selective repeat continuous Automatic Retransmission request (ARQ). However, the present invention introduces an important difference from this known technique by utilizing a device/method that eliminates delay, making the device/method of the present invention highly suitable for realtime and/or interactive communications.

The output binary bitstream from a predictive source waveform encoder is split into data units (DUs), each DU having at least a header and an information field. Depending on the specific applications, a data unit can be a transmission frame, a packet, or an ATM cell. The size of each DU does not have to be the same. Before transmission, these DUs are labeled with consecutive numbers called sequence numbers (SNs). In typically applications, Cyclic Redundancy Check (CRC) codes are also included in DUs in order to facilitate error detection at the receiver. Copies of these DUs are stored in a memory at the transmitter. The capacity of the memory is typically chosen such that it can hold an amount of data that corresponds to the round-trip delay. At the receiver, the SN and CRC of each received DU are checked to see whether a DU has been lost or damaged. When the receiver finds that a DU has been damaged or lost, the receiver sends a retransmission request for that particular DU to the transmitter for retransmission. However, instead of waiting for the arrival of the retransmission, the decoder in the receiver in this invention proceeds to process all the following DUs. Upon receiving the retransmitted DU, the receiver adds the information contained in that DU to the decoded signal. Therefore, no buffering delay is introduced at the receiver. On the other hand, when using the conventional ARQ technique, the receiver holds all the DUs it receives after receiving the damaged DU until the arrival of the retransmitted DU, and then resumes its normal operation. Therefore, an extra delay will be introduced when using the conventional ARQ technique.

Figure 1:
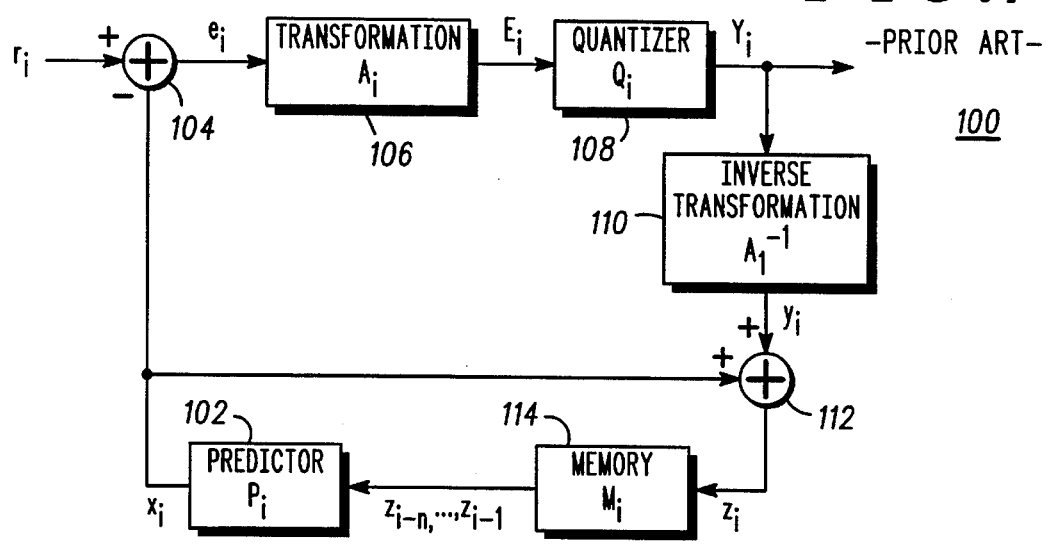
FIG. 1 is a block diagram schematic of a predictive waveform encoder as is known in the art.
Figure 2:
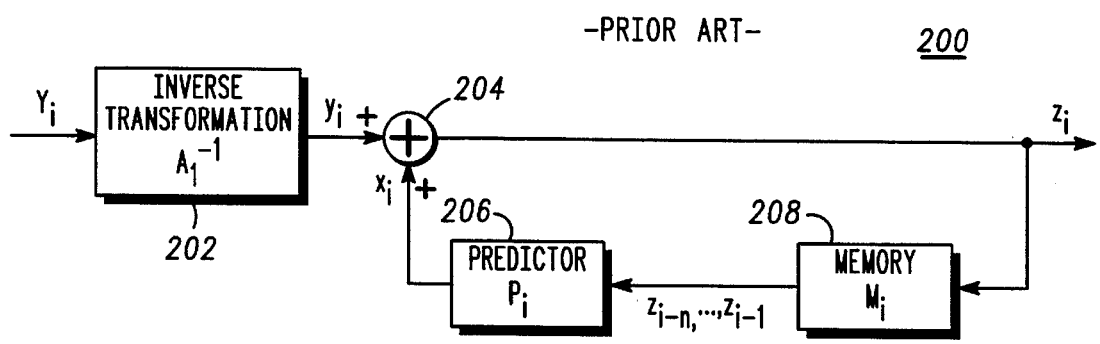
FIG. 2 is a block diagram schematic of a predictive waveform decoder that typically operates in conjunction with an encoder of FIG. 1, as is known in the art.
Figure 3:
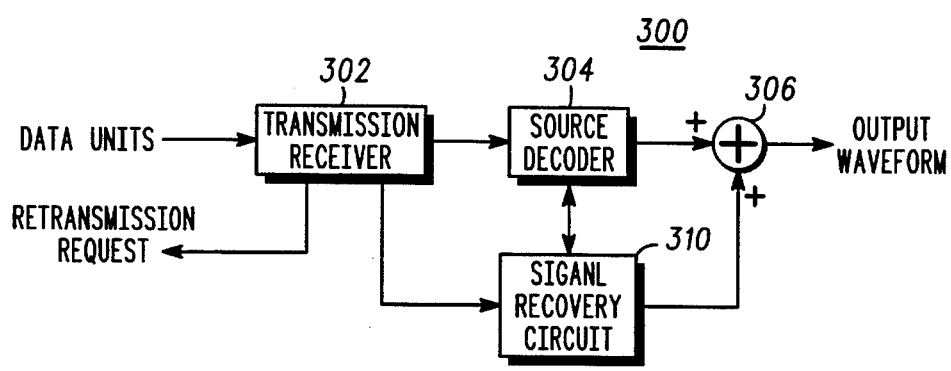
FIG. 3 is a general block diagram schematic of a device in accordance with the present invention.

FIG. 3, numeral 300, is a block diagram schematic of one embodiment of a signal loss recovery device in accordance with the present invention. The signal loss recovery device of the present invention includes: a transmission receiver (302), a source decoder (304), a signal recovery adder (306), and signal recovery circuitry (308). The transmission receiver (302) is operably coupled to receive the plurality of data units from the physical channel and to a signal recovery circuitry and is utilized for detecting whether a data unit has been damaged/lost during transmission, and for generating a retransmission request to a transmitter for retransmission of the damaged/lost data unit, for signaling signal recovery circuitry that the data unit is damaged/lost, and for generating a binary bitstream from the received data units. The source decoder (304) is operably coupled to the transmission receiver (302) and the signal recovery circuitry (308) and is utilized for decoding the binary bitstream to provide an output and for, where a data unit is damaged/lost, facilitating error concealment and signal loss recovery. The signal recovery circuitry (308) is operably coupled to the transmission receiver and the source decoder and is utilized for, where a data unit is damaged/lost, tracing error propagation and generating a correction signal from the retransmitted data unit. The signal recovery adder (306) is operably coupled to the source decoder (304) and to the signal recovery circuitry (308) and is used for, where the data unit has been damaged/lost, providing the sum of the output from the source decoder and the correction signal from the signal recovery circuitry to provide an output waveform for a recovered signal.

Thus, the transmission receiver (302) receives DUs from a physical channel, processes headers and the CRCs of the DUs, and passes the resulting information to the source decoder (304) and the signal recovery circuitry (308). The transmission receiver (302) regenerates the SNs from the headers of the DUs, and these SNs are used to check whether a DU has been lost during transmission. In addition, the CRC of each DU is used to check whether the DU has been damaged during transmission. When there is neither DU damage nor loss, the transmission receiver (302) simply passes a bitstream to the source decoder and the source decoder performs normal decoding as a conventional decoder. When a DU damage/loss occurs, the source decoder (304) cooperates with the signal recovery circuitry (308) to perform error concealment and signal loss recovery. When a DU is damaged or lost, the transmission receiver will detect the event and identify the damaged DU's SN. Where a DU has been damaged or lost, the transmission receiver executes the following operations: (1) sending a retransmission request containing the SN of the damaged/lost DU to the transmitter for retransmission; and (2) signaling the signal recovery circuitry (308) of the event of signal loss such that the signal recovery circuitry (308) starts its operation. The signal recovery circuitry (308) generates concealment vectors for the damaged vectors. Before the arrival of the retransmitted DU, the source decoder (304) continues its normal decoding and generates error corrupted output signal vectors. In this process, the source decoder (304) continuously passes decoded 5 side information to the signal recovery circuitry (308). After the transmission receiver (302) receives the retransmitted DU, the signal recovery circuitry generates a correction signal vector from the information contained in the retransmitted DU, which is first processed by the source decoder (304). The signal recovery adder (306) combines the output signals from the source decoder (304) and the signal recovery circuitry (308) to generate an output waveform for a recovered signal.

Figure 4:
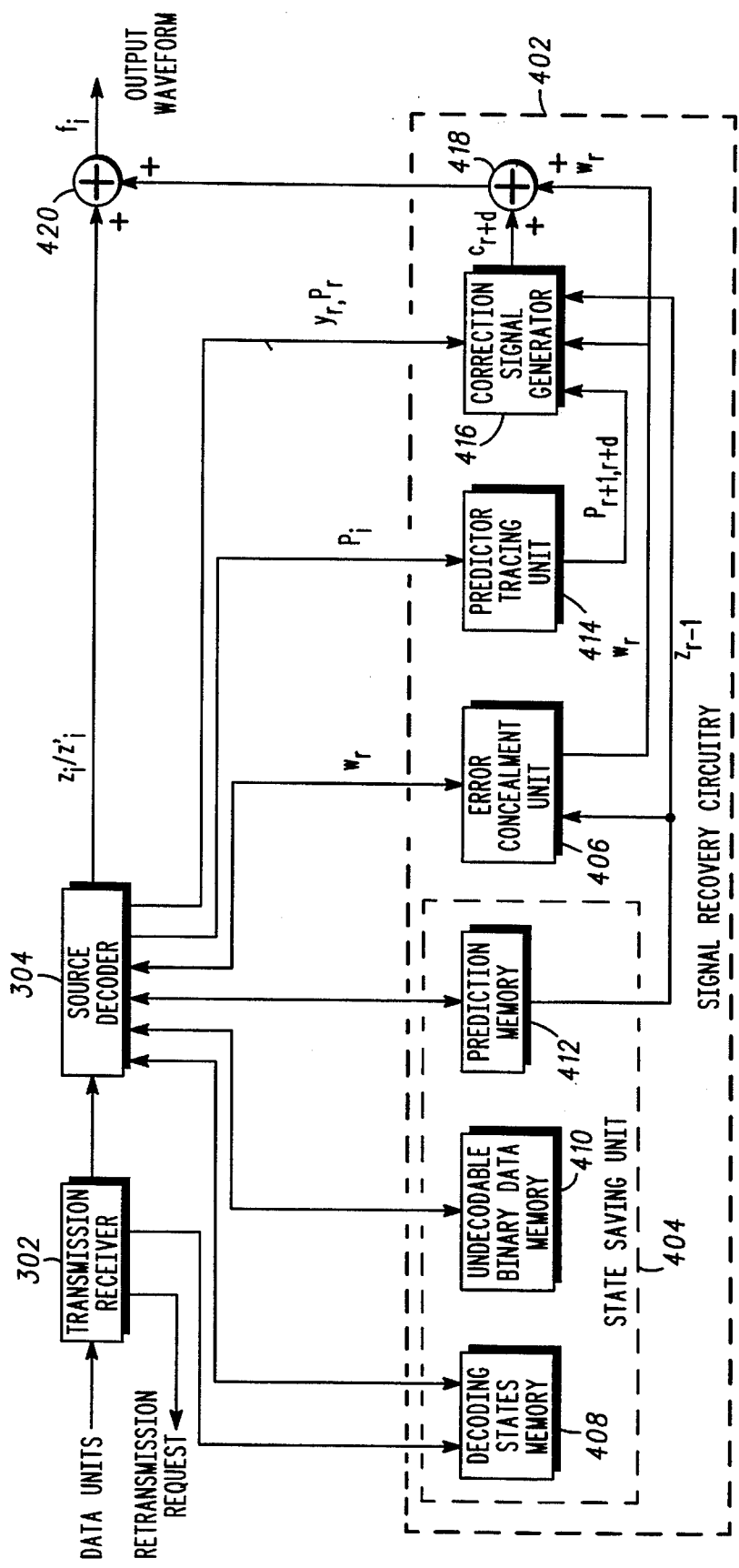
FIG. 4 is a block diagram schematic of the device of FIG. 3 shown with greater particularity.

One embodiment of the signal loss recovery device of FIG. 3 is shown with greater particularity in FIG. 4, numeral 400. The device includes: (A) a transmission receiver (302) which is operably coupled to receive, process data units from the channel and detect whether data unit (DU) damage/loss occurred during transmission; (B) a source decoder (304) that is operably coupled to receive a bitstream from the transmission receiver (302) and to receive outputs from a state saving unit (404) and an error concealment unit (406) of signal recovery circuitry (402) and is used for decoding the bitstream utilizing information from the state saving unit (404) and the error concealment unit (406); (C) the signal recovery circuitry (402), which is operably coupled to the transmission receiver (302) and the source decoder (304) for, where DUs have been damaged/lost, providing error concealment and signal recovery function, wherein the signal recovery circuitry (402) includes a state saving unit (404), an error concealment unit (406), a predictor tracing unit (414), a correction signal generator (416) and a correction signal adder (418); and (D) a signal recovery adder (420) which is operably coupled to the source decoder (304) and the signal recovery circuitry (402), for combining the outputs from the correction signal adder (418) of the signal recovery circuitry (402) and the source decoder (304).

As shown in FIG. 4, the state saving unit (404), which is operably coupled to the transmission receiver (308) and the source decoder (304), is used to save decoding states and information when DU damage occurs. The state saving unit (404) includes: (C1a) a decoding states memory (408) which is operably coupled to the transmission receiver (302) and the source decoder (304) to receive and store decoding state information upon the occurrence of DU loss/damage for provision of said information to the source decoder (304); (C1b) an undecodable binary data memory (410) which is operably coupled to the source decoder (304) to receive and store unprocessable information for the source decoder (304), where unprocessability is due to DU damage/loss, for providing the unprocessable information to the source decoder (304) upon the arrival of a retransmitted DU; and (C1c) a prediction memory (412) which is operably coupled to the source decoder (304), for saving prediction memory upon the occurrence of DU loss/damage and providing the prediction memory to the error concealment unit (406) and to the correction signal generator (41 6).

The error concealment unit (406) is operably coupled to the prediction memory (412) of the state saving unit (404) and is used to perform error concealment for those samples whose information is contained in the damaged DU and the undecodable data, thus providing error concealment information. The predictor tracing unit (414) is operably coupled to the source decoder (304) for tracing the prediction operations performed for each sample vector between the DU damage and the arrival of the retransmitted DU. The correction signal generator (416) is operably coupled to the source decoder (304), the prediction memory (412) of the state saving unit (404), the error concealment unit (406) and the predictor tracing unit (414), and is used for generating a correction signal vector, wherein the correction signal vector is obtained from information contained in the state saving unit (404), the predictor tracing unit (414), the error concealment unit (406) and the retransmitted DU. The correction signal adder (418) is operably coupled to the error concealment unit (406) and the correction signal generator (416), for summing the correction signal vector and the error concealment information.

When incoming DUs are errorless, the transmission receiver (302) outputs a bitstream to the source decoder (304), which performs normal decoding, and the outputs from both the error concealment unit (406) and the correction signal generator (416) are zero. However, upon detecting an error, the transmission receiver (302) sends a retransmission request with the SN of the damaged DU to the transmitter for retransmission. The transmission receiver (302) also signals the state saving unit (404) to save all the information which is necessary to continue the decoding process after receiving the retransmitted DU. Where Variable Length Coding (VLC) is used in a source encoder and where there is DU damage/loss, the source decoder (304) searches for a predetermined search point in the DUs following the damaged DU to facilitate restoration of its decoding operation. For example, a predetermined search point may be a start code in H.261 or MPEG. During the time between the DU damage/loss and the restoration of source decoder operation, the source decoder (304) does not generate output sample vectors; instead, the error concealment unit (406) generates replacement sample vectors so that an output device (e.g., a microphone in speech applications, a TV monitor in video applications) is supplied with continuous waveforms to be played out.

A simplest concealment scheme is the repetition of the last sample vector in the prediction memory. Other more sophisticated concealment techniques, as are known in the art, may also be used. For video applications, see e.g., Q.-F. Zhu, et al., "Coding and cell loss recovery for DCT-based packet video," IEEE Trans. CAS for Video Technology, pp. 248–258, June 1993. Because the output from the source decoder (304) for these vector sample times is zero, the output waveforms are only the error concealed vectors output from the error concealment unit. The predictor tracing unit (414) is operably coupled to the source decoder (304). The predictor tracing unit (414) traces linear prediction operators $P_i$ for i=r+1, r+2, ..., r+d, where r is the time index for the first damaged sample and d is the delay time from the first damaged sample vector to the arrival of the retransmission. Note that $P_r$ is typically also damaged due to the DU loss if forward adaptation is used in the encoder. The correction signal generator (416) is operably coupled to the source decoder (304), the prediction memory (412) of the state saving unit (404), the error concealment unit (406) and the predictor tracing unit (414). The function of the correction signal generator (416) is to add the information contained in the retransmitted DU and the undecodable DUs stored in the undecodable binary data memory to the error corrupted output signal from the source decoder (304) to provide a signal to the signal recovery adder (420) such that all the future samples will be the same as those without any signal damage.

The method and device of the present invention restore error corrupted sample vectors to corresponding original vectors without signal loss by utilizing the retransmitted DU in a novel scheme that eliminates delay, as described more fully below.

In the following description, where the loss of a DU only damages one sample vector $Y_r$ and the associated side information, the predictor $P_r$ at sample time r (for example, the motion vector and macroblock type (Mtype) information in H.261), where forward adaptation is used at the encoder, and the predictor order are each equal to 1. Since the prediction, transformation, and all the other operators are linear in the source decoder, the cases of multiple samples' damage and the predictor order other than 1 can also be shown in the same way. Let $a_r$ and $Q_r$ be the concealment vector and predictor used to replace $Y_r$ and $P_r$ to obtain the concealment vector $w_r$. Then the output of the device at sample time r is:

$$W_r = a_r + Q_r(Z_{r-1})$$

where $Z_{r-1}$ is the output vector of the source decoder (304) at sample time r–1.

In many applications, the zero vector is used for $a_r$, and $Q_r$ is simply 1. That is, the last sample vector is copied as the concealment vector. So the above equation is simplified to:

$$w_r = Z_{r-1}.$$

The vector $w_r$ is also saved into the frame buffer of the source decoder (304) to generate the output at sample time r+1. Let d be the delay between the DU damage and the retransmission arrival. Then from sample time r+1 to r+d, the error corrupted output of the source decoder (304) is derived as follows:

$$z'_{r+1} = y_{r+1} + P_{r+1}(w_r);$$
$$z'_{r+2} = y_{r+2} + P_{r+2}(z'_{r+1})$$
$$= y_{r+2} + P_{r+2}(y_{r+1}) + P_{r+2}(P_{r+1}(w_r))$$
$$= y_{r+2} + P_{r+2}(y_{r+1}) + P_{r+1, r+2}(w_r);$$
$$\ldots$$
$$z'_{r+d} = y_{r+d} + P_{r+d}(y_{r+d-1}) + \ldots + P_{r+1, r+d}(w_r);$$

where the following notation has been used for the multistage linear predictor for brevity:

$$P_{r+1, r+d}(X) = P_{r+d}(P_{r+d-1}(P_{r+d-2}(\ldots P_{r+1}(X)\ldots)));$$

Similarly, the following relation is derived for the output sample vector zr+d where no DU is damaged during transmission:

$$Z_{r+d} = Y_{r+d} + P_{r+d} Y_{r+d-1} + \ldots + P_{r+1, r+d}(Y_r) + P_{r, r+d}(Z_{r-1}).$$

Thus, the correction error vector to be added into $z'_{r+d}$ in order to recover $z_{r+d}$ is:

$$c_{r+d} = z_{r+d} - z'_{r+d}$$
$$= P_{r, r+d}(z_{r-1}) + P_{r+1, r+d}(y_r) - P_{r+1, r+d}(w_r)$$
$$= P_{r+1, r+d}(P_r(z_{r-1})) + P_{r+1, r+d}(y_r) - P_{r+1, r+d}(w_r)$$
$$= P_{r+1, r+d}(P_r(z_{r-1}) + y_r - w_r)$$
$$= P_{r+1, r+d}(s_r);$$

where $s_r = P_r(Z_{r-1}) + Y_r - W_r$.

Therefore, after the arrival of the retransmitted DU, $Y_r$ and $P_r$ are obtained from the information contained in the retransmitted DU, the undecodable binary data memory (410), and the decoding states memory (408). The predictor tracing unit (414) provides the multistage linear prediction operator $P_{r+1, r+d}$ or, alternatively, the information to form the operator. $Z_{r-1}$ is obtained from the prediction memory (412). Finally, $w_r$ is obtained from the error concealment unit (406). Thus, after the arrival of the retransmitted DU, the correction signal generator (416) generates the correction signal vector $c_{r+d}$ and adds it into the error corrupted output $z'_{r+d}$ of the source decoder (304). From this point on, the output waveform of the device will be restored to the original output without signal damage, and the signal recovery circuitry (402) will remain inactive until a next DU damage happens.

Note in the above derivation, that if no prediction is used, i.e., $P_i=0$, in encoding any of the sample vectors from sample time r+1 to r+d, then there is no need to perform signal correction at time r+d since the error propagation stops at the sample vector which is coded without using prediction. Furthermore, if it is found that no prediction was used to encode the vector at sample time r after receiving the retransmitted DU, then the vector $s_r$ is simplified to the following form as a result of $P_r=0$:

$$S_r = Y_r - W_r.$$

The function of the predictor tracing unit (414) is to obtain the multistage linear prediction operator $P_{r+1,r+d}$. In the method of the present invention, one of two schemes is typically used to implement $P_{r+1,r+d}$. In the first scheme, the linear predictor operation is accumulated at each sample time from r+1 to r+d. Therefore, when receiving the retransmitted DU at sample time r+d, the operator $P_{r+1,r+d}$ is ready to be used to generate $C_{r+d}$ by the correction signal generator. However, in some applications, this procedure may be quite complicated to implement. In the second scheme, as an alternative to the first scheme, nothing is done during period of sample time from r+1 to r+d, except to save all the linear predictor $P_i$, where i=r+1, . . . , r+d. After receiving the damaged DU, the source decoder (304) first processes the received DU and the data stored in the undecodable binary data memory to generate the vector $Y_r$ and the linear predictor $P_r$. Then the correction signal generator forms the vector $s_r$, and applies the linear predictor $P_{r+1}$, . . . , $P_{r+d}$, sequentially, to this vector to obtain the correction signal vector $c_{r+d}$.

Figure 5:
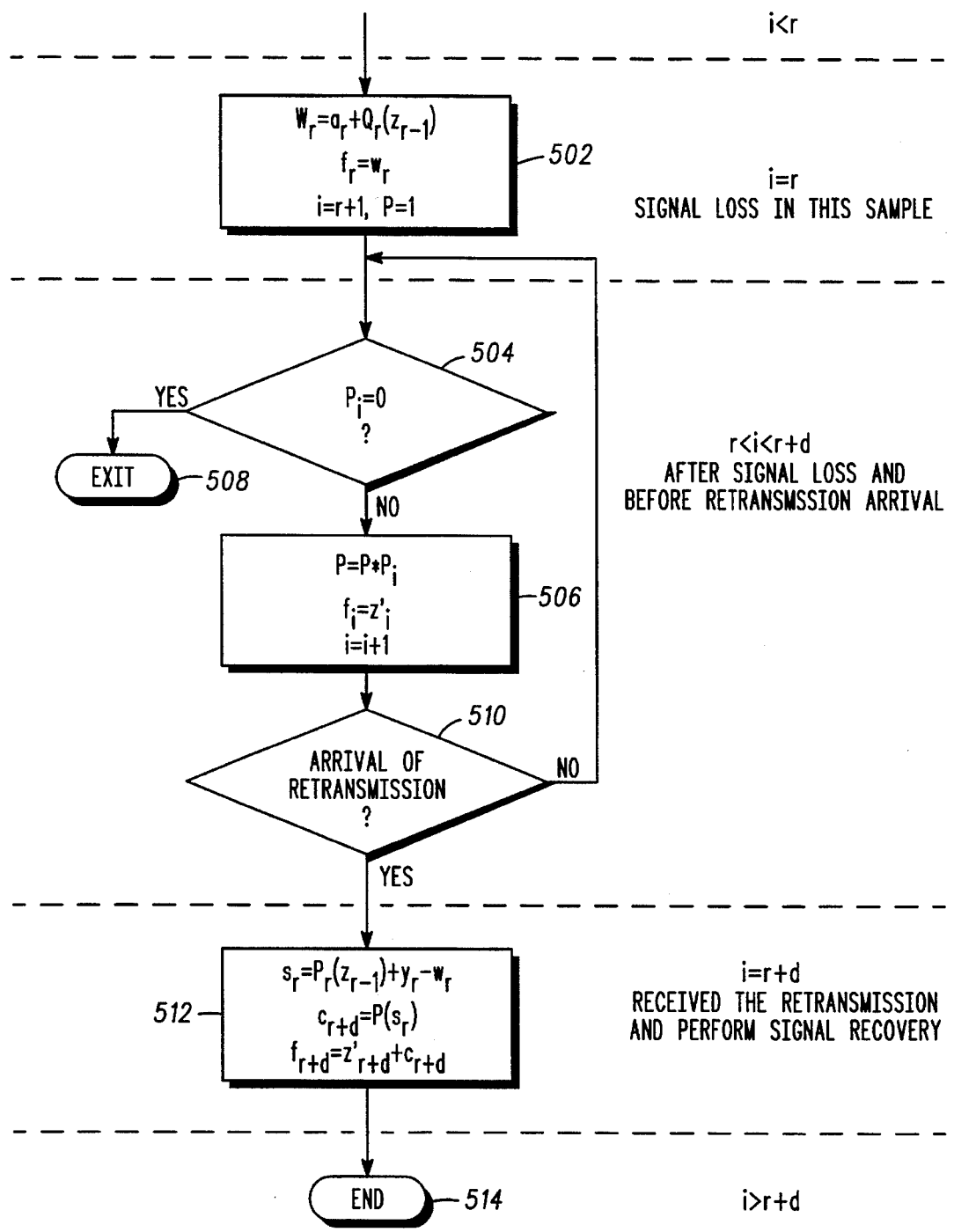
FIG. 5 shows a flow chart of one embodiment of steps in accordance with the method of the present invention.

FIG. 5, numeral 500, shows a flowchart of the operations for a signal loss recovery device in accordance with the present invention wherein the first scheme of implementation of $P_{r+1,r+d}$ is utilized. When the transmission receiver finds DU damage at sample time r, the error concealment unit generates a concealment vector $w_r$ and the output of the whole device $f_r$ is $w_r$ since there is no output from the source decoder (502). Also, in this step, the variable i is initialized to r+1 and the linear predictor is initialized as the identity operator, i.e., P(x)=x. Then, in each sample time until r+d, $P_i$ is examined to determine whether Pi is equal to zero (504). Where Pi is unequal to zero, the linear predictor P is updated to incorporate the linear predictor $P_i$ (506). During this process, where any $P_i$ is found to be zero, i.e., no prediction was used to encode the sample vector $Y_i$, then the process takes an early exit and no further signal correction is performed as explained above (508). Then, the device for signal loss recovery determines whether retransmission of a damaged/lost DU has been received (510). Where a damaged/lost DU is unreceived (510), the device recycles to determining whether Pi is equal to zero (504). After the retransmitted DU has been received, i.e., after i reaches r+d, signal recovery is performed (512): (1) The correction generator signal (416) first forms the vector $S_r$ based on the information contained in the retransmitted DU, the undecodable binary data memory, the prediction memory and the error concealment unit; (2) the linear operator P is applied to $s_r$ to obtain the correction signal vector $c_{r+d}$; and (3) the error correction vector $c_{r+d}$ is added to the error corrupted output $z'_{r+d}$ of the source decoder to form the output of the whole device $f_{r+d}$. From this point on (514), until a next damaged DU or signal loss occurs, the output of the signal recovery device is zero since the source decoder generates the identical output vectors to those without any DU damage.

Figure 6:
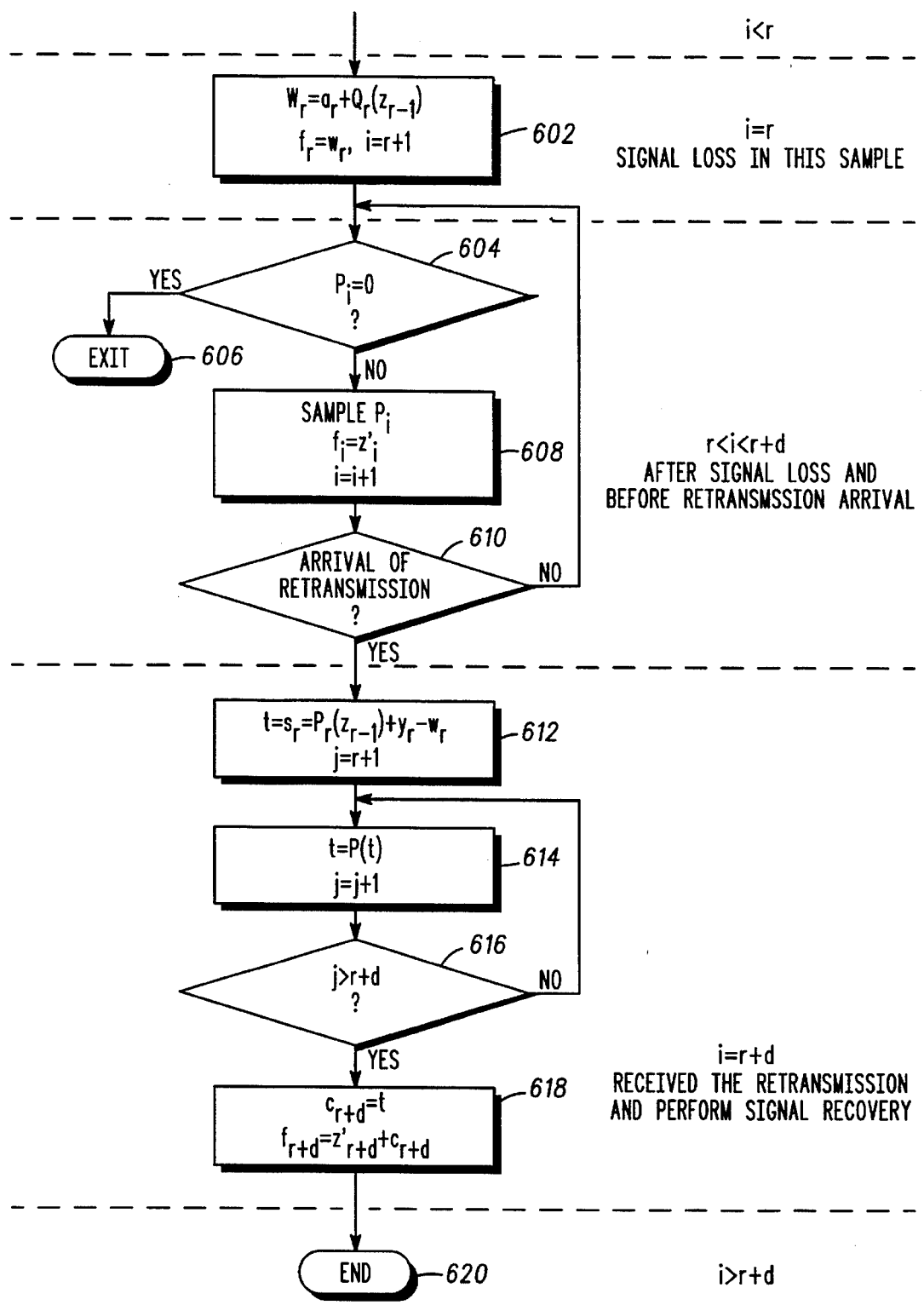
FIG. 6 shows a flow chart of an alternative embodiment of steps in accordance with the method of the present invention.

FIG. 6, numeral 600, shows the flowchart of the operations involved in the signal recovery device based on the second scheme of implementation of $P_{r+1,r+d}$. It is different from the method based on the first scheme shown in FIG. 5 in that during the period of sample time from r+1 to r+d, the predictor tracing unit (414) saves the operator $P_{r+1}, P_{r+2}, \ldots, P_{r+d}$. Based on the same reasoning, $P_i$ is checked to determine whether $P_i$ is equal to zero (604), and where any $P_i$ is found to be zero, no further signal correction is performed (606). Where $P_i$ is non-zero, $P_i$ is saved, $f_i$ is set equal to $Z_i$, and i is set equal to i+1, where i=r+1, r+2, . . . , r+d, is a time index indicating the order in which input vectors are processed (608). After the retransmitted DU has been received, i.e., i=r+d, the correction signal generator (418) first forms the vector $t=s_r=P_r(Z_{r-1})+Y_r-w_r$, and sets j=r+1, where r is the time index for the first damaged sample (612). Vector t is set equal to $P_j(t)$ and j is set equal to j+1 (614). Then j is examined to determine whether j>r+d (616). Where j<r+d, the device recycles to setting vector t equal to $P_j(t)$ and j equal to j+1 (614). Where j exceeds r+d, the error correction signal vector $C_{r+d}$ is obtained by $C_{r+d}=t$. The vector $C_{r+d}$ is added to the output of the source decoder $z'_{r+d}$ to form the output of the whole device $f_{r+d}$ (618). From this point on, the procedure is not in operation until another DU is damaged or lost.

The device and method of the present invention may be utilized to perform signal loss recovery for a realtime and/or interactive video communication system which is based on any hybrid video coding algorithm, such as H.261 and MPEG. In a typical hybrid video coder, motion-compensated prediction (MCP) is used to reduce the temporal redundancy existing between adjacent video frames, and Discrete Cosine Transform (DCT) is applied to the prediction error signal to eliminate the spatial redundancy existing between spatially adjacent pixel samples.

FIG. 7, numeral 700, shows a block diagram of a typical hybrid video encoder as is known in the art. The hybrid encoder includes: a first adder (702), operably coupled to receive video frames and to receive the output from a first switch (728); a DCT unit (704), operably coupled to the first adder (702); a quantizer (706) operably coupled to the DCT unit and to a quantizer control unit (708); a variable-length encoder (710) operably coupled to the quantizer and to receive side information including intra/inter mode, loop filter (726) on/off, motion vector; a buffer (712) operably coupled to the variable-length encoder (710), for outputting encoded video bits; an inverse DCT unit (714), operably coupled to the quantizer (706); a second adder, operably coupled to the inverse DCT unit (714) and to the output of the first switch (728); a frame buffer (718) operably coupled to the second adder (716); a motion estimation unit (720) operably coupled to the frame buffer (718) and to receive input video frames; a motion compensation unit (722), operably coupled to the frame buffer (718) and to the motion estimation unit (720); a second switch (724) operably coupled to the motion compensation unit (722); a loop filter (726), operably coupled to the second switch (724); and an inter/intra determining unit (730), operably coupled to the motion compensation unit (722) and to receive input video frames, for controlling the first switch (728). The input to the encoder is a sequence of video frames. Each frame consists of a luminance component Y and two chrominance components Cb and Cr. The Cb and Cr components usually have only half of the resolution of Y in both horizontal and vertical directions. The size of the video frames and the frame rate depends on the specific application. Each video frame is first partitioned into non-overlapping segments called macroblocks (MB's). Each MB consists of four Y blocks, one Cb and one Cr block, where each block is a square block of 8×8 pixels.

Let $MB_{i,k}$ denote the k'th macroblock of frame i. The vector $r_{i,k}$ is formed by sequentially putting the pixel values of the six blocks of $MB_{i,k}$ into the elements of $r_{i,k}$. The encoder in FIG. 7 operates in the following manner: First, a motion estimation unit (722) utilizes a scheme to determine a motion vector $v_{i,k}=(v_{(i,k)x}, v_{(i,k)y})$. Typically, the scheme searches the luminance component of the previous reconstructed frame $b_{i-1}$ stored in the frame buffer (718) for a 16×16 square block $B_{i-1}$ in a predetermined search window such that it minimizes an error function. For H.261, the maximum search window is 31×31 with the upper left pixel of the MB at the center. The motion vector $v_{i,k}$ is defined as the spatial displacement between $B_i$ and $MB_i$. Because the search can be only performed in the search window, the range of the motion vector is known given the search window. For H.261, both $v_{(i,k)x}, v_{(i,k)y}$ have the range from −15 to +15. The pixels that lie in $B_{i-1}$ form the motion-compensated prediction vector $u_{i,k}$. Note that motion estimation can be performed down to fractional pixel precision by using interpolation for the prediction vector $u_{i,k}$. Thus, the motion estimation unit is operably coupled to the frame buffer and provides a motion vector to the motion compensation unit (720), which is also operably coupled to the frame buffer (718). The inter/intra mode selection unit (730) that is operably coupled to receive the input vector $r_{i,k}$ and the motion compensated prediction vector $u_{i,k}$ makes the decision that whether $MB_{i,k}$ should be coded in intra or inter mode. The prediction vector $x_{i,k}$ of the input vector $r_{i,k}$ is obtained from $u_{i,k}$ based the output of the inter/intra mode selection unit:

a) In the intra mode, set $x_{i,k}=0$;

b) in the inter (predictive) mode:

b1) Where the loop filter switch (LFS) (724) is "off", set $x_{i,k}=u_{i,k}$;

b2) Otherwise, the element of $u_{i,k}$ is filtered by a predetermined two-dimensional filter, and the output of the filter is set to $x_{i,k}$.

Note that the use of the loop filter is application dependent. In MPEG, there is no loop filter. In H.261, the use of the loop filter is also optional.

At the first adder (702), the prediction vector xi,k is subtracted from the input vector $r_{i,k}$ to generate the prediction error vector $e_{i,k}=r_{i,k}-x_{i,k}$. A DCT transform is applied to each block contained in the vector $e_{i,k}$ to generate the DCT coefficient vector $E_{i,k}$. The quantizer (706) is operably coupled to receive the vector $E_{i,k}$ and quantizes the elements of $E_{i,k}$ using scalar quantization to generate a quantized DCT coefficient vector $Y_{i,k}$. The variable-length encoder (710) is operably coupled to perform the lossless encoding of the vector $Y_{i,k}$ and the side information such as the coding mode and the motion vector $v_{i,k}$. A buffer (712) and the quantizer control unit (708) are usually used to generate a bitstream of predetermined bitrate characteristics such as constant bitrate (CBR) or variable bitrate (VBR). The buffer is operably coupled to receive the binary bits output from the variable-length encoder. The quantizer control is operably coupled to monitor the buffer fullness of the buffer and adjustment quantization stepsize of the quantizer to ensure that the buffer suffers neither overflow nor underflow.

The quantized vector $Y_{i,k}$ is also inverse quantized and undergoes an inverse DCT to generate the vector $Y_{i,k}$. At the second adder (716), the vectors $x_{i,k}$ and $Y_{i,k}$ are summed to form the reconstructed vector $z_{i,k}$, which is stored in the frame buffer (718) to form a reconstructed frame $b_i$ for use of the motion estimation and compensation for the coding of the next video frame.

When there is no channel error, the hybrid decoder will perform the inverse operation of the encoder to generate a reconstructed video sequence. FIG. 8, numeral 800, shows a typical hybrid decoder. For $MB_{i,k}$, the decoder operates in the following way: the variable length (VL) decoder (802) is operably coupled to receive the binary bits and output the quantized DCT coefficient vector $Y_{i,k}$ and the associated side information. After inverse quantization, the six blocks contained in vector $Y_{i,k}$ are utilized to generate the vector $Y_{i,k}$ in an inverse DCT unit (804). The motion compensation unit (810) uses the coding mode and motion vector $V_{i,k}$ to generate a prediction vector $u_{i,k}$ from the content of the frame buffer $b_{i-1}$ (808). The LFS (812) is either turned "on" or "off", based on the decoded side information. If the LFS (812) is "on", The prediction vector $u_{i,k}$ is modified by applying the same two-dimensional loop filter (814) used in the corresponding encoder to generate $x_{i,k}$. When the loop filter is "off", then $x_{i,k}=u_{i,k}$. At the adder (806), a reconstructed vector $z_{i,k}$ is generated by summing the two vectors $Y_{i,k}$ and $x_{i,k}$. The vector $z_{i,k}$ is output to the output device and is also saved in the frame buffer (808) for the decoding of the next frame.

Since the hybrid video encoder contains a prediction loop, a channel error will lead to error propagation. Even worse, where VLC is used at the source encoder (802), the damage of a DU will result in the following DUs undecodable until the decoder detects a synchronization word, such as the start code in H.261 and MPEG. Therefore, error concealment and error recovery is necessary to obtain an output signal with acceptable quality without introducing any extra delay.

Figure 9:
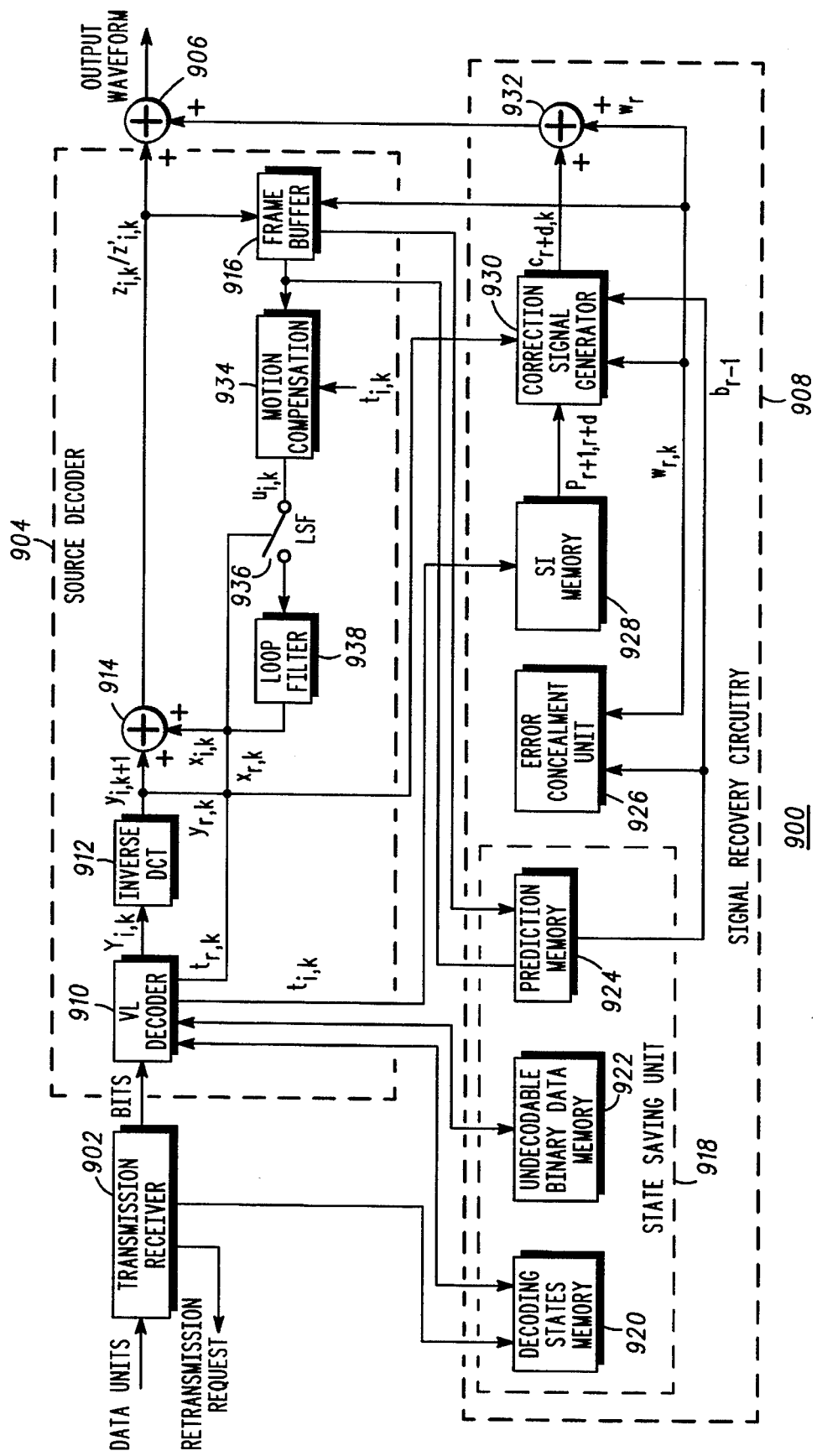
FIG. 9 shows a block diagram of one embodiment of a device for recovering, in accordance with the present invention, lost/damaged information in a realtime and/or interactive video communication system which is based on hybrid video coding.

FIG. 9, numeral 900, shows a device for recovering, in accordance with the present invention, a signal having lost/damaged information in a realtime and/or interactive video communication system which is based on hybrid video coding. The device includes a transmission receiver (902), a source decoder (904), signal recovery circuitry (908), and a signal recovery adder (906). The source decoder (904) of FIG. 9 is a hybrid video decoder that includes: A) a variable length (VL) decoder (910), operably coupled to receive bits from the transmission receiver (902), a decoding states memory (920) of the signal recovery circuitry (908), and the undecodable binary data memory (922) of the signal recovery circuitry (908), for generating side information including intra/inter mode, loop filter on/off, motion vector and quantization stepsize, and DCT coefficient vector; B) an inverse DCT unit (912), operably coupled to the VL decoder (910), for calculating an inverse DCT vector for the output from the VL decoder; C) a feedback adder (914), operably coupled to the inverse DCT unit (912) and to receive a motion compensated prediction vector from one of a loop filter (938) and a loop filter switch LFS (936), for summing the motion compensated prediction vector with the inverse DCT vector to provide an adder output vector; D) a frame buffer (916), operably coupled to the feedback adder (914) and to an error concealment unit (926) of the signal recovery circuitry (908), for buffering the adder output vector and providing a frame buffer output for input into a motion compensation unit (934) and to the prediction memory (924) of the state saving unit (918); E) the motion compensation unit (934), operably coupled to the frame buffer (916) and to the prediction memory (924) of the state saving unit (918), for selectably utilizing output of one of the frame buffer output and prediction memory together with side information from the VL decoder (910) to provide a motion compensated prediction vector; F) the loop filter switch (936), operably coupled to the motion compensation unit (934), for, based on decoded side information, selectably outputting a prediction vector to one of: the feedback adder (914) and the loop filter (938); and G) the loop filter (938), operably coupled to the loop filter switch (936), for providing a modified prediction vector to the feedback adder (914).

Where the transmission receiver (902) determines that a DU sent to the transmission receiver (902) has been damaged/lost during frame period r, a retransmission request is sent with the SN of the damaged/lost DU to the transmitter for retransmission of said DU. At the same time, the transmission receiver signals the state saving unit (918) to save the current decoding states of the source decoder (904) into the decoding states memory (920) and to copy the content of the frame buffer (916) of the source decoder (904) into the prediction memory (924) in the state saving unit (918). Where the encoder uses VLC, the VL decoder (910) will search for the next synchronization codeword, such as the start code in H.261, in the following DUs to resume its decoding process, generating side information and quantized DCT coefficient vector $Y_{i,k}$. Vector $Y_{i,k}$ is utilized to generate the vector $Y_{i,k}$ in an inverse DCT unit (912). The undecodable binary bits preceding the synchronization word are saved in the undecodable binary data memory (922) for later use. For the MBs, starting from the first MB contained in the damaged DU, up to the MB immediately before the synchronization codeword, the error concealment unit (926) generates a replacement MB vector $w_{r,k}$ to the output terminal for display, according to the following relation:

$$w_{r,k}=a_{r,k}+Q_{r,k}(b_{r-1});$$

where $a_{r,k}$ and $Q_{r,k}$ are used to replace $Y_{r,k}$ and $P_{r,k}$, respectively, and $Q_{r,k}(b_{r-1})$ is the motion compensated vector obtained from frame buffer content $b_{r-1}$ and $Q_{r,k}$ is the concealment motion compensated predictor.

As is set forth above, the simplest concealment method is to use $a_{r,k}=0$ and $Q_{r,k}=1$:

$$w_{r,k}=z_{r-1,k};$$

which is equivalent to copy $MB_{r-1,k}$ at the same spatial location in the previous reconstructed video frame $b_{r-1}$. For a more sophisticated concealment technique in the art, see, e.g., Q.-F. Zhu, et al, "Coding and cell loss recovery for DCT-based packet video," IEEE Trans. CAS for Video Technology, pp. 248–258, Jun. 1993. Note that for these damaged MBs in the current video frame, the output from the source decoder (904) is zero. Therefore, the output from the device is $w_{r,k}$. These concealment vectors are also saved into the frame buffer (916) of the source decoder for decoding of the following frame.

In all the following video frames until the arrival of the retransmitted DU, the source decoder (904) performs normal decoding and outputs error corrupted signal vector for the damaged MBs. At the same time, the predictor tracing unit (414) shown in FIG. 4 becomes active. In FIG. 9, the predictor tracing unit (414) is implemented by the first scheme, i.e., saving all the predictor operations used in the process. The side information ti,k for $MB_{i,k}$ is stored into the side information, i.e., SI, memory (928) and includes the coding mode (intra/inter, loop filter on/off, etc.) and the motion vector $v_{i,k}$ for each MB in these frames. During these video frames, the output from the signal recovery circuitry (908) is zero, and hence the output of the device only comes from the source decoder (904). After receiving the retransmitted information, the source decoder (904), operably coupled to receive bits from the transmission receiver (902), first decodes the information contained in the retransmitted DU and the binary information stored in the undecodable binary data memory (922), to obtain the side information $t_{r,k}$ and DCT coefficient vector $Y_{i,k}$ for all the damaged MBs. Then the correction signal generator (930) utilizes the resulting information and the content of the side information memory (928) and the error concealment unit (926) to obtain the correction signal vector $c_{r+d,k}$ for each MB according to:

$$C_{r+d,k}=P_{(r+1, r+d),k}(S_{r,k});$$

where $S_{r,k}=P_{r,k}(b_{r-1})+Y_{r,k}-w_{r,k}$.

Note that due to the use of MCP, those MB which were not damaged in frame r can be contaminated. Therefore, to ensure that the contaminated MBs are corrected, the correction signal vector is formed for all the MBs in the video frame. However, for those uncontaminated MBs, the multistage predictor $P_{r+1,r+d}$ will be zero. Therefore the corresponding correction vector will be also zero. Vector $Y_{i,k}$ from the VL decoder (910) is utilized to generate the vector $Y_{i,k}$ in an inverse DCT unit (912). A feedback adder (914) is operably coupled to the inverse DCT unit (906) for summing a predictor vector xi,k and the output vector $Y_{i,k}$. The output of the adder $z_{i,k}/z_{i,k}'$ is output to the second adder (906) and is also saved into the frame buffer (916). A second adder (906) is operably coupled to the feedback adder (914) and to a signal recovery circuitry (908), sums the two outputs of the feedback adder and the signal recovery circuitry to provide the output for the whole device. The frame buffer (916) is operably coupled to the feedback adder (914) and the error concealment unit (926) of the signal recovery circuitry (908). During normal operation, the buffer receives input from the feedback adder. Where a DU damage/loss happens, the frame buffer will accept input from the error concealment unit. The motion compensation unit (934) is operably coupled to the frame buffer (916) and to the prediction memory (924) of the signal recovery circuitry, and receive side information input $t_{i,k}$ from the VL decoder (910). The loop filter switch, LFS (936) is operably coupled to the motion compensation unit (934) and the loop filter (938), which is operably coupled to the loop filter switch (936). The prediction vector $X_{i,k}$ is obtained as described in more detail above.

The signal recovery circuitry (908) of FIG. 9 includes the state saving unit (918), the error concealment unit (926), the SI memory (928) and the correction signal generator (930). The state saving unit (918) includes: (1) a decoding states memory (920) that is operably coupled to the transmission receiver (902) to receive decoding state information from the source decoder (904) upon a DU damage/loss, for providing decoding state information to the VL decoder (910) upon the arrival of the retransmitted DU; (2) undecodable binary data memory (922), operably coupled to the VL decoder (910) to receive and store the information which the VL decoder (910) is not able to process due to DU damage, but which will be used upon the arrival of a retransmitted DU; (3) prediction memory (924), operably coupled to the frame buffer (916), for saving the frame buffer content and providing information to the error concealment unit (926) and to the correction signal generator (930). The error concealment unit (926) is operably coupled to receive information from the prediction memory (924), and provides vector $w_{r,k}$, described above, to the correction signal generator (930), to the frame buffer (916), and to the third adder (932), for providing input to the second adder (906). The SI memory (928) is operably coupled to receive side information from the VL decoder (910), saves all the side information for each MB during video frame period from r+1 to r+d, and outputs said side information to the correction signal generator (930) upon the arrival of he retransmitted DU. The correction signal generator (930) is operably coupled to the inverse DCT (912), to the SI memory (928), to the error concealment unit (926), to the prediction memory (924) and to the loop filter/LFS, and outputs vector cr+d,k as described above, to the third adder (932) for input to the second adder (906). The third adder (932) is operably coupled to receive the correction vector Cr+d,k and vector $w_{r,k}$ and provides the sum of these two vectors to the second adder (906).

Figure 10:
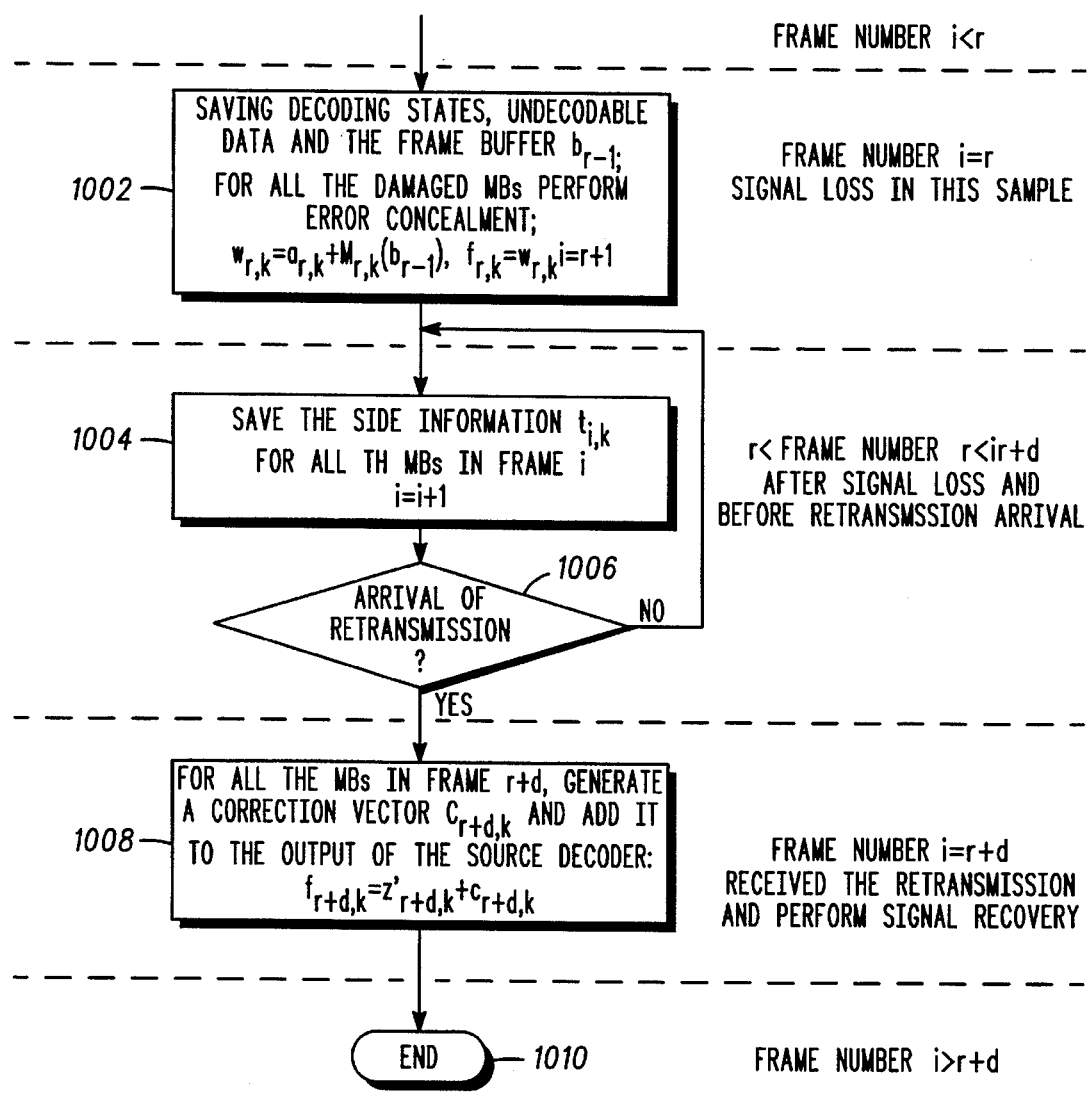
FIG. 10 is a flow chart of an embodiment of steps for signal loss recovery in a video communication system in accordance with the method of the present invention.

FIG. 10, numeral 1000, is a flow chart of an embodiment of steps for signal recovery in a video communications system in accordance with the method of the present invention. When the transmission receiver detects an error in frame r, it sends a retransmission request to the encoder for the retransmission of the damaged DU and also signals the state saving unit to save all the decoding states, undecodable data and the frame buffer content $b_{r-1}$. For each damaged $MB_{r,k}$, the error concealment unit generates a concealment vector $w_{r,k}$ to output to the external terminal for display (1002). In this step the vector $w_{r,k}$ is also stored into the frame buffer of the source decoder, and the variable i is initialized as r+1. During video frame period from r+1 to r+d, the side information memory saves all the side information ti,k for each MB (1004). After saving the side information, the device determines whether a DU retransmission has arrived (1006). Where no retransmission has been received, the device recycles to saving the side information for all MBs in frame i(1004). Where a retransmitted DU has been received, the correction signal generator generates a correction signal vector $C_{r+d,k}$ which is then added into the output of the source decoder (1008): $f_{r+d,k}=z_{r+d,k}+C_{r+d,k}$. At this point (1010), the frame number i>r+d, and the process ends until another DU is lost/damaged.

Figure 11:
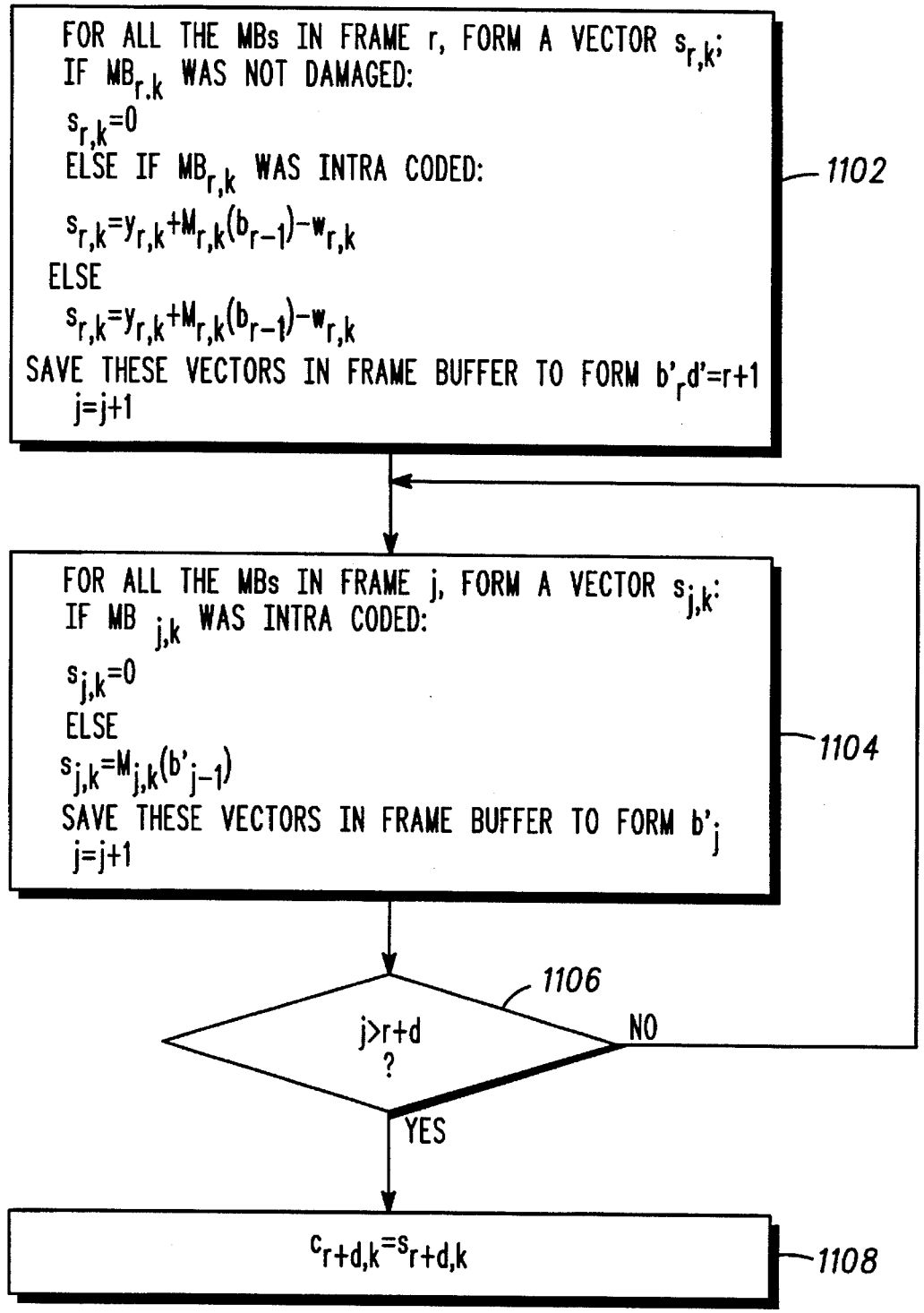
FIG. 11 is a flow chart of one embodiment of the steps for generating the correction signal vectors of FIG. 10 in accordance with the present invention.

The steps used for generating the correction signal vector are shown in the flowchart, FIG. 11, numeral 1100. After receiving the retransmitted DU, the source decoder decodes the information contained in the DU and the undecodable data, assisted by the decoding states saved in the decoding states memory. The result of the decoding is the side information $t_{r,k}$ and the vector $Y_{r,k}$ for all the damaged MBs in frame r. For all the MBs in frame r, in the first step (1102), the vector $S_{r,k}$ is formed in the following way:

(a) where $MB_{r,k}$ was not damaged in frame r, $S_{r,k}=0$;

(b) else if $MB_{r,k}$ was coded in intra mode in frame r, then $S_{r,k}=Y_{r,k}-w_{r,k}$;

(C) otherwise, $S_{r,k}=Y_{r,k}+M_{r,k}(b_{r+1})-w_{r,k}$; where $M_{r,k}(b_{r-1})$ represents the motion compensated vector with the motion vector contained in $t_{r,k}$ and the last reconstructed frame $b_{r-1}$ in the frame buffer. The vectors $S_{r,k}$ are stored in the frame buffer to form $b'_r$ and the variable j is initialized to r+1. In the second step, for j from r+1 to r+d, the vector $S_{r,k}$ is formed by using the side information $t_{j,k}$ in side information memory in the following way:

(a) where $MB_{j,k}$ was intra coded, $S_{j,k}=0$;

(b) otherwise, $s_{j,k}=M_{j,k}(b'_{j-1})$; where $M_{j,k}(b'_{j-1})$ represents the motion compensated vector with the motion vector contained in $t_{j,k}$ and the last reconstructed frame $b'_{j-1}$ in the frame buffer. The vectors $s_{j,k}$ are saved into the frame buffer to form $b'_j$ for the next iteration. Then, in the third step (1106), the device determines whether j is greater than r+d.

Where j is less than or equal to r+d, the device recycles to performing the second step (1104). Thus, j is incremented by 1 each time step 2 (1104) is performed, until j reaches r+d+1. The resulting vector $S_{r+d,k}$ is the signal correction vector $C_{r+d,k}$ for $MB_{r+d,k}$ (1108).

Because a video frame is coded on macroblock basis, and the prediction is also performed on the macroblock basis, the tracing of the multistage linear predictor $P_{r+1,r+d}$ is very complicated if either loop filter (such as in H.261) or fractional pixel motion compensation is used, e.g., in MPEG, wherein half pixel motion compensation is used, since such an operation will make the prediction of one pixel in the current frame involve multiple pixels in its previous frame. Part of the multiple pixels may be contaminated while the rest are not contaminated. However, in some instances, for example, when using an H.261 encoder, the encoder may be implemented without the loop filter to reduce complexity. If only integer pixel motion estimation is used without utilizing a loop filter in the encoder, the tracing of the prediction becomes simple.

Figure 12:
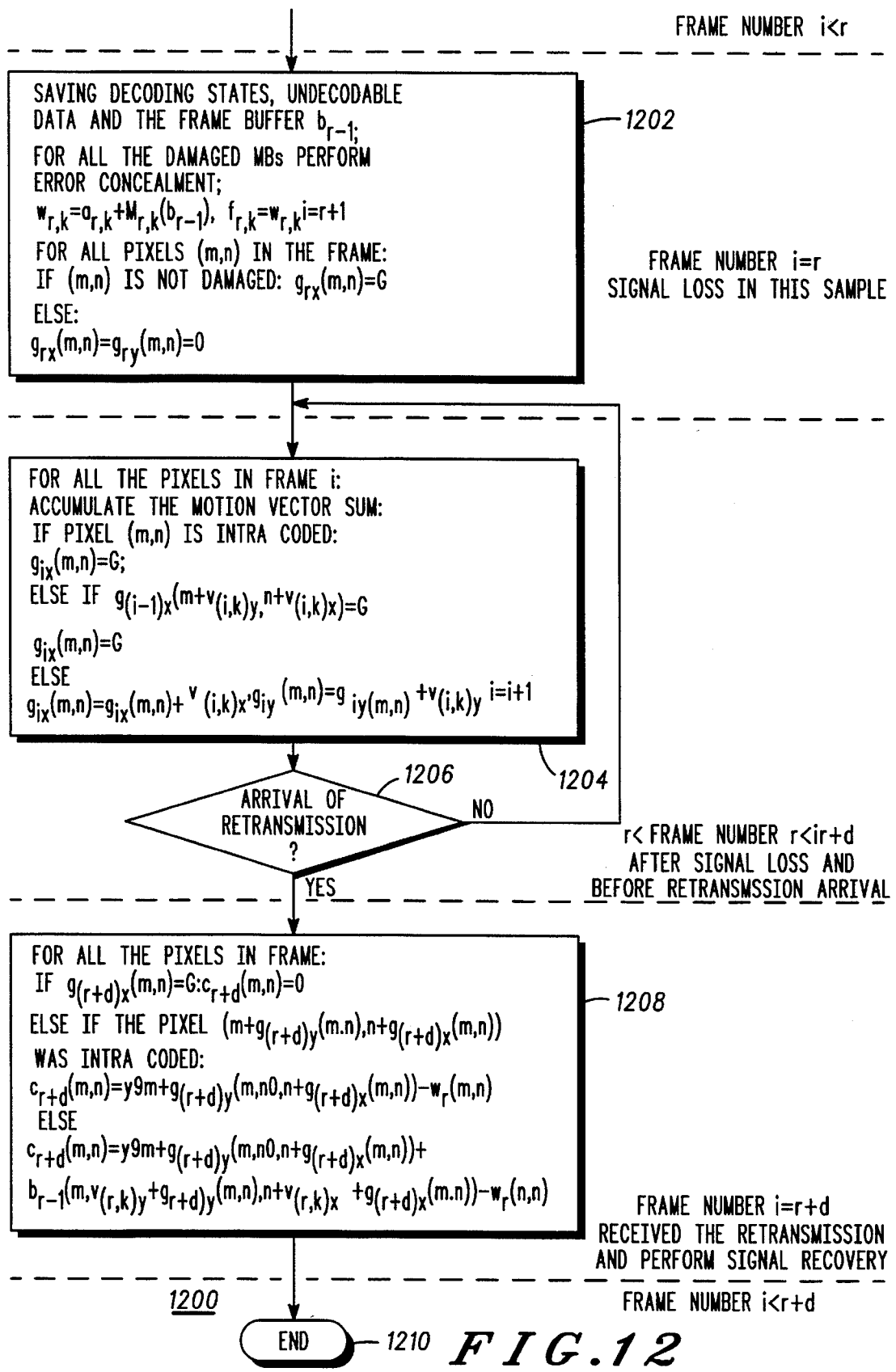
FIG. 12 is a flow chart showing the steps for another embodiment of the signal loss recovery in accordance with the method of the present invention.

FIG. 12, numeral 1200, is a flowchart showing the steps for another embodiment of the signal loss recovery method of the present invention when only integer pixel motion compensation is used without a loop filter at the encoder. Since only integer pixel motion compensation is used in this embodiment, the predicted vector for a MB is obtained by copying a vector specified by the motion vector in the previously reconstructed frame. However, note that the prediction vector typically comes from several vectors in the previous frame. In order to simplify the description below, all operation is described on a pixel basis instead of on a vector basis. For example, yi(m,n) represents the prediction error signal for pixel (m,n) in frame i.

Tracing the prediction of a pixel is equivalent to summing the motion vectors along its route from the start frame to the end frame. Note that during this process, if a pixel is coded in intra mode, then the error propagation stops. In this case, instead of storing the sum of the motion vectors, a flag G is stored. Due to the limited range of the motion vector, the flag can be stored in one of the two motion vector components without introducing any ambiguity. In FIG. 12, the x component of the motion vector sum is used to store the flag G.

Therefore in this embodiment, two frame buffers, $g_{ix}$, $g_{iy}$, are created for tracing the motion of each pixel from frame r+1 to r+d in the x and y directions, respectively. In frame r, when DU damage occurs, for step 1 (1202), shown in FIG. 12, decoding states are saved in decoding states memory, undecodable data is saved in the undecodable binary data memory and the frame buffer $b_{r-1}$ is saved in the prediction memory. In addition, in step 1 (1202), the error concealment unit operates to generate concealment vectors and save them in the frame buffer of the source decoder:

$w_{r,k}=a_{r,k}+M_{r,k}(b_{r-1}); f_{r,k}=w_{r,k}$, i=r+1; and for all pixels (m,n) in frame r, the two motion vector sum frame buffers are initialized as follows:

where (m,n) is undamaged, $g_{rx}(m,n)=G$, and otherwise, $g_{rx}(m,n)=g_{ry}(m,n)=0$.

In step 2 (1204), from frame period r+1 to r+d, the motion vector sum for each pixel is traced as follows:

(a) where pixel (m,n) is intra coded, then $g_{ix}(m,n)=G$;

(b) else if the corresponding pixel in the previous frame has a G flag, i.e., $g_{(i-1)x}(m+v_{(i,k)y}, n+v_{(i,k)x})=G$, then $g_{ix}(m,n)=G$, where $v_{(i,k)x}$, $v_{(i,k)y}$ are the motion vectors in the horizontal and vertical directions for $MB_{(i,k)}$, which contains pixels (m,n);

(c) else accumulate the motion vector sums:

$g_{ix}(m,n)=g_{ix}(m,n)+v_{(i,k)x}$, $g_{iy}(m,n)=g_{iy}(m,n)+v_{(i,k)y}$.

In addition, in step 2 (1204), the variable i is incremented by 1 until the arrival of the retransmitted DU.

In step 3 (1206) of FIG. 12, the device determines whether a DU retransmission has arrived. Where no DU retransmission has arrived, the device recycles to implementing step 2 (1204). Upon the arrival of the retransmission, in step 4 (1208), the error correction signal for each pixel is generated as follows:

(a) where pixel (m,n) is of flag G, i.e., $g_{(r+d)}(m,n)=G$, then $c_{r+d}(m,n)=0$;

(b) else if pixel $(m+g_{(r+d)y}(m,n), n+g_{(r+d)x}(m,n))$ was intra coded in frame r, then $c_{r+d}(m,n)=y_r(m+g_{(r+d)y}(m,n), n+g_{(r+d)x}(m,n))-w_r(m,n)$;

(c) otherwise, $c_{r+d}(m,n)=y_r(m+g_{(r+d)y}(m,n), n+g_{(r+d)x}(m,n))+b_{r-1}(m+v_{(r,k)y}+g_{(r+d)y}(m,n), n+v_{(r,k)x}+g_{(r+d)x}(m,n))-w_r(m,n)$.

Where a DU has been damaged/lost, the correction signal for each pixel $c_{r+d}(m,n)$ is added to the corresponding pixel of the source decoder output $z'_{r+d}(m,n)$ to generate the output for the device $f_{r+d}(m,n)$. After the above steps, signal recovery is completed (1210), and for each subsequent frame, the signal recovery circuitry will be inactive until the next DU damage/loss.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A device for signal loss recovery of a sequence of vectors generated by a predictive waveform encoder and carried over a channel by a plurality of data units for realtime and/or interactive communications, comprising:

A) a transmission receiver, operably coupled to receive the plurality of data units from the channel and to a signal recovery circuitry, for detecting whether a data unit has been damaged/lost during transmission, and for generating a retransmission request to a transmitter for retransmission of the damaged/lost data unit, for signalling signal recovery circuitry that the data unit is damaged/lost, and for generating a binary bitstream from the received data units:

B) a source decoder, operably coupled to the transmission receiver and the signal recovery circuitry, for decoding the binary bitstream to provide an output and for, where a data unit is damaged/lost, facilitating error concealment and signal loss recovery;

C) the signal recovery circuitry, operably coupled to the transmission receiver and the source decoder, for, where a data unit is damaged/lost, providing error concealment, tracing error propagation and generating a correction signal from the retransmitted data unit; and D) a signal recovery adder, operably coupled to the source decoder and to the signal recovery circuitry, for, where the data unit has been damaged/lost, providing the sum of the output from the source decoder and the correction signal from the signal recovery circuitry to provide an output waveform for a recovered signal, wherein the signal recovery circuitry includes:

E) a state saving unit, operably coupled to the transmission receiver and to the source decoder, for saving decoding states and information from data units upon detection of data unit damage/loss;

F) an error concealment unit, operably coupled to a prediction memory of the state saving unit, for performing error concealment for vectors damaged due to a data unit damage/loss to provide error concealment information;

G) a predictor tracing unit, operably coupled to the source decoder, for tracing prediction operations performed on sample vectors from the time of the data unit damage/loss until arrival of the retransmitted data unit to provide predictor tracing information;

H) the correction signal generator, operably coupled to the predictor tracing unit, to the error concealment unit, to the source decoder, and to the prediction memory of the state saving unit, for generating a correction signal vector from information contained in the retransmitted data unit and the state saving unit; and I) a correction signal adder, operably coupled to the error concealment unit and the correction signal generator, for providing the sum of the outputs from the error concealment unit and the correction signal generator to the signal recovery adder.

2. The device of claim 1 wherein the state saving unit includes:

A) a decoding states memory, operably coupled to the source decoder and the transmission receiver, for receiving and storing decoding state information upon the occurrence of data unit loss/damage, and providing the stored information to the source decoder after the arrival of the retransmitted data unit;

B) an undecodable binary data memory, operably coupled to the source decoder, for receiving and storing undecodable data which the source decoder is unable to process due to data unit damage/loss, for utilization by the source decoder upon the arrival of the retransmitted data unit;

C) the prediction memory, operably coupled to the source decoder, for saving prediction information from the source decoder upon the occurrence of the data unit damage/loss and for providing the prediction information to the source decoder and the correction signal generator.

3. The device of claim 1 wherein the source decoder has a predictor of order equal to 1.

4. The device of claim 1 wherein a prediction error vector from the predictive waveform encoder undergoes a transformation before quantization.

5. The device of claim 4 wherein said transformation is constant.

6. The device of claim 5, where said transformation is linear.

7. The device of claim 4 wherein said prediction error vector has dimensionality equal to 1.

8. The device of claim 1 wherein the correction signal vector is generated by processing the retransmitted data unit and undecodable bits stored in the undecodable binary data memory by the source decoder and then combining the output of the source decoder with the error concealment information, the prediction memory information and the predictor tracing information to generate the correction signal vector.

9. The device of claim 8 wherein the correction signal vector, $c_{r+d}$, for recovering a sample vector for a damaged/lost data unit is of a form:

$$c_{r+d}=P_{r+1,r+d}(s_r);$$

where $s_r=P_r(z_{r-1})+y_r-w_r$, where $y_r$ and $P_r$ represent the decoded prediction vector and the linear predictor contained in the retransmitted data unit and the undecodable binary data memory, and r is the time index for the first damaged sample for the data unit and d is the delay time from the first damaged sample vector to the arrival of the retransmission of the damaged/lost data unit, $z_{r-1}$ is the sampled vector output of the source decoder at time r−1 and is stored in the prediction memory, $w_r$ is the concealment vector used for concealment of the damaged output vector and $P_{r+1, r+d}(x) = P_{r+d}(P_{r+d-1}(P_{r+d-2}( \ldots P_{r+1}(x) \ldots )))$ represents a multistage linear predictor, where $P_i$ are prediction operators for i=r+1, r+2, ..., r+d.

10. The device of claim 9 wherein the concealment vector $w_r$ at sample time r, r a positive integer, is of a form:

$$w_r = a_r + Q_r(z_{r-1}),$$

where $z_{r-1}$ is the sampled vector output of the source decoder at time r−1, and $a_r$ and $Q_r$ are preselected values.

11. The device of claim 9 wherein the multistage linear predictor $P_{r+1,r+d}$ is traced by the predictor tracing unit by saving all predictors $P_i$ where i=r+1, r+2, ..., r+d and the signal correction vector $c_{r+d}$ is obtained by sequentially applying these predictors to the vector $s_r$.

12. The device of claim 9 wherein the multistage linear predictor $P_{r+1,r+d}$ is traced by the predictor tracing unit by:

A) initializing a linear operator P=I, where I is an identity matrix of the order equal to the dimensionality of the source decoder input vector;

B) for each prediction iteration until the retransmitted data unit arrives, updating P to incorporate the received predictor $P_i$: $P = P*P_i$; and C) after the retransmitted data unit arrives at sample time r+d, setting $P_{r+1,r+d} = P$.

13. The device of claim 1 wherein said prediction waveform encoder is a hybrid video encoder, where a video frame is segmented into non-overlapping macroblocks (MB) and each MB is coded by motion compensated prediction (MCP) for temporal prediction and Discrete Cosine Transform (DCT) is applied to the prediction error MB.

14. The device of claim 13 wherein the source decoder is a hybrid video decoder, comprising:

A) a variable length (VL) decoder, operably coupled to receive bits from the transmission receiver, the decoding states memory, and the undecodable binary data memory, for generating side information including intra/inter mode, loop filter on/off, motion vector and quantization stepsize, and DCT coefficient vector;

B) an inverse DCT unit, operably coupled to the VL decoder, for calculating an inverse DCT vector for the output from the VL decoder;

C) a feedback adder, operably coupled to the inverse DCT unit and to receive a motion compensated prediction vector from one of a loop filter and a loop filter switch, for summing the motion compensated prediction vector with the inverse DCT vector to provide an adder output vector;

D) a frame buffer, operably coupled to the feedback adder and to an error concealment unit of the signal recovery circuitry, for buffering the adder output vector and providing a frame buffer output for input into a motion compensation unit and to the prediction memory of the state saving unit;

E) a motion compensation unit, operably coupled to the frame buffer and to the prediction memory of the state saving unit, for selectably utilizing output of one of the frame buffer output and prediction memory and side information from the VL decoder to provide a motion compensated prediction vector;

F) a loop filter switch, operably coupled to the motion compensation unit, for, based on decoded side information, selectably outputting the prediction vector to one of: the feedback adder and a loop filter; and G) the loop filter, operably coupled to the loop filter switch, for providing a modified prediction vector to the feedback adder.

15. The device of claim 13 wherein the signal recovery circuitry includes:

A) a state saving unit, operably coupled to the transmission receiver, to the source decoder, for saving decoding states and information from data units upon detection of data unit damage/loss;

B) an error concealment unit, operably coupled to a prediction memory of the state saving unit, for performing error concealment for vectors damaged due to a data unit damage/loss to provide error concealment information;

C) a predictor tracing unit, operably coupled to the VL decoder, for tracing the motion compensated predictor received from the VL decoder and providing the multistage motion compensated predictor/information to generate a multistage motion compensated predictor;

D) the correction signal generator, operably coupled to the predictor tracing unit, to the error concealment unit, to the VL decoder, and to the prediction memory of the state saving unit, for generating a correction signal vector from information contained in the retransmitted data unit and the state saving unit; and E) a correction signal adder, operably coupled to the error concealment unit and the correction signal generator, for providing a sum of the correction signal vector and error concealment information to the signal recovery adder.

16. The device of claim 15 wherein the state saving unit includes:

A) a decoding states memory, operably coupled to the source decoder and the transmission receiver, for receiving and storing decoding state information upon the occurrence of data unit loss/damage, and providing the stored state information to the VL decoder after the arrival of the retransmitted data unit;

B) an undecodable binary data memory, operably coupled to the VL decoder, for receiving and storing undecodable data which is unprocessable by the VL decoder due to data unit damage/loss, for utilization by the VL decoder upon the arrival of the retransmitted data unit;

C) the prediction memory, operably coupled to the frame buffer of the source decoder, for saving contents of the frame buffer upon the occurrence of the data unit damage/loss and for providing frame buffer information to the motion compensation unit upon arrival of the retransmitted data unit and to the error concealment unit and the correction signal generator for error concealment and signal recovery.

17. The device of claim 15 wherein the correction signal vector for each MB is generated by processing the retransmitted data unit and undecodable bits stored in the undecodable binary data memory by the source decoder and then combining the output of the source decoder with the error concealment information, the prediction memory information and the predictor tracing information to generate the correction signal vector.

18. The device of claim 17 wherein the correction signal vector, $c_{r+d}$, for recovering a sample vector for each MB is of a form:

$$C_{r+d}=P_{r+1,r+d}(s_r);$$

where $s_r=P_r(b_{r-1})+Y_r-w_r$, where $y_r$ is the output vector of the inverse DCT unit and $P_r$ is the linear predictor derived from the side information output from the VL decoder, and r is the time index for the damaged video frame due to the data unit damage/loss, and d is the delay time in frame from the damaged video frame to the arrival of the retransmission of the damaged/lost data unit, $b_{r-1}$ is the content of the prediction memory, $w_r$ is the concealment vector used for concealment of the damaged MB in frame r, and $P_{r+1, r+d}(x)=P_{r+d}(P_{r+d-1}(P_{r+d-2}(\ldots P_{r+1}(x)\ldots)))$ represents a multistage motion compensated predictor, where $P_i$ are motion compensated predictors for i=r+1, r+2, ..., r+d.

19. The device of claim 15 wherein the concealment vector $w_r$ of the device at sample time r, r a positive integer, is of a form:

$$w_r=a_r+Q_r(b_{r-1}),$$

where $b_{r-1}$ is the content of the prediction memory, and $a_r$ and $Q_r$ are preselected values.

20. The device of claim 18 wherein the vector $s_r$ is a zero vector for all undamaged MBs in frame r.

21. The device of claim 18 wherein, where the MB was found to be coded in intra mode from the retransmitted data unit, the vector $s_r$ is of the following form:

$$s_r=y_r-w_r.$$

22. The device of claim 18 wherein a multistage motion compensated predictor $P_{r+1,r+d}$ for each MB is traced by the predictor tracing unit by saving all side information for each MB from frame r+1 to frame r+d, and the signal correction vector $c_{r+d}$ for each MB is obtained by sequentially applying these predictors to the vector $s_r$ of each MB.

23. The device of claim 13 wherein the hybrid video encoder only employs integer motion compensation without a loop filter.

24. The device of claim 23 wherein a multistage motion compensated predictor $P_{r+1,r+d}$ is traced on individual pixel basis and the $P_{r+1,r+d}$ is realized by summing all motion vectors for each pixel from r+1 to r+d.

25. The device of claim 13 wherein the hybrid video encoder is one of: H.261 and MPEG.

26. A method for providing signal loss recovery of a sequence of vectors generated by a predictive waveform encoder for a realtime and/or interactive communication system, comprising the steps of:

upon a transmission receiver of the communication system determining, at sample time r, that a data unit containing sample vectors has been damaged/lost;

A) sending a retransmission request, by the transmission receiver with the sequence number of the damaged/lost data unit to the transmitter of the communication system;

B) generating a concealment vector $w_r$ wherein, where a source decoder lacks an outout, a digital communication device output $f_r$ equals $w_r$, where $w_r=a_r+Q_r(z_{r-1})$, and $a_r$ is a predetermined first concealment vector, $Q_r$ is a predetermined predictor, $z_{r-1}$ is the content of the prediction memory in the source decoder:

C) continuing, by the source decoder, normal decoding and outputting an error corrupted vector, and also tracing a linear predictor applied to each sample vector to generate a multistage linear predictor $P_{r+1, r+d}$ until arrival of the retransmitted data unit; and D) upon receiving the retransmitted data unit, generating a correction signal vector from information contained in the retransmitted data unit and the multistage linear predictor and adding the correction signal vector to the output of the source decoder to restore the corrupted signal vector to an original form without signal damage/loss, wherein tracing the multistage linear predictor $P_{r+1,r+d}$ and generating the correction signal vector are implemented in the following steps:

E) determining whether the decoded vector $y_i$ at sample time i is coded with prediction, whether $P_i$ is equal to zero;

F) where $P_i$ equals zero, stopping tracing the linear prediction since no signal recovery is needed;

G) where $P_i$ is nonzero, saving, by a predictor tracing unit, the linear predictor $P_i$;

H) determining, by a transmission receiver, whether the retransmission of the damaged/lost data unit has arrived;

I) where the retransmission of the damaged/lost data unit is unreceived, go to step F);

J) where the retransmission of the damaged/lost data unit has been received, generating the correction signal vector $c_{r+d}$ by sequentially applying the linear predictor $P_{r+1}, P_{r+2}, \ldots, P_{r+d}$ to the vector $s_r$, where $s_r=P_r(z_{r-1})+Y_r-w_r$; $Y_r$ and $P_r$ are the received sample vector and predictor used at sample r derived from the retransmitted data unit and $z_{r-1}$ is the content of the frame memory of the source decoder at sample time r, and $w_r$ is the concealment vector used at sample time r.

27. The method of claim 26 wherein tracing the multistage linear predictor $P_{r+1,r+d}$ and generating the correction signal vector are implemented in the following steps:

29A) initializing the linear predictor as an identity operator;

29B) determining whether a decoded vector $y_i$ at sample time i is coded with prediction, whether $P_i$ is equal to zero;

29C) where $P_i$ equals zero, stopping tracing the linear prediction since no signal recovery is needed;

29D) where $P_i$ is nonzero, incorporating the linear predictor $P_i$ into P by $P=P^* P_i$, 29E) determining, by a transmission receiver, whether the retransmission of the damaged/lost data unit has arrived;

29F) where the retransmission of the damaged/lost data unit is unreceived, recycling to step 29B);

29G) where the retransmission of the damaged/lost data unit has been received, setting $P_{r+1, r+d}=P$, and generating the correction signal vector $c_{r+d}$ by:

$$c_{r+d}=P_{r+1,r+d}(s_r);$$

where $s_r=P_r(z_{r-1})+y_r-w_r$; $y_r$ and $P_r$ are the received sample vector and predictor used at sample r derived from the retransmitted data unit and $z_{r-1}$ is the content of the frame memory of the source decoder at sample time r, and $w_r$ is the concealment vector used at same time r.

28. The method of claim 26 wherein the source decoder has a predictor of order equal to 1.

29. The method of claim 26 wherein a prediction error vector from the predictive waveform encoder undergoes a transformation before quantization.

30. The method of claim 29 wherein said transformation is constant.

31. The method of claim 30, where said transformation is linear.

32. The method of claim 29 wherein said prediction error vector has dimensionality equal to 1.

33. The method of claim 26 wherein said prediction waveform encoder is a hybrid video encoder, where a video frame is segmented into non-overlapping macroblocks (MB) and each MB is coded by motion compensated prediction for temporal prediction and Discrete Cosine Transform (DCT) is applied to the prediction error MB.

34. The method of claim 33 wherein tracing the multi-stage motion compensated predictor and generating the correction signal vector for each MB are implemented as:

where $M_{r,k}(b_{r-1})$ represents, for a macroblock, a motion compensated vector predicted with a motion vector and a reconstructed frame $b_{r-1}$ in the frame buffer;
  A) for all MBs in frame i, where i ranges from r+1, the frame immediately following the damaged frame r, to r+d, the frame after the retransmitted data unit is received, saving all the side information for each MB in a side information memory;
  B) after the arrival of the retransmitted data unit, for all the MBs in the video frame, forming a vector $S_{r,k}$ as follows:
    B1) where the MB was not damaged in frame r, setting $S_{r,k}=0$;
    B2) where the MB was intra coded in frame r, setting $S_{r,k}=Y_{r,k}-w_{r,k}$, where $Y_{r,k}$ is derived from the retransmitted data unit and $w_{r,k}$ is the concealment vector used in frame r to replace the damaged MB;
    B3) otherwise setting $s_{r,k}=M_{r,k}(b_{r-1})+Y_{r,k}W_{r,k}$, where $M_{r,k}(b_{r-1})$ represents a motion compensated vector with a motion vector derived from the retransmitted data unit and the frame $b_{r-1}$ in the prediction memory; saving all the $s_{r,k}$ in the frame buffer as $b_r'$ to replace $b_{r-1}$;
  C) for all the MBs in the video frame and variable j from r+1 to r+d, repeating the following operation by using the side information stored in the side information memory:
    C1) where $MB_{j,k}$ is intra coded, setting $S_{j,k}=0$;
    C2) otherwise, setting $S_{j,k}=M_{j,k}(b'_{j-1})$; and storing vectors $s_{j,k}$ into the frame buffer to form $b'_j$ for a next iteration;
  D) setting a correction vector $c_{r+d,k}$ equal to vector $s_{r+d,k}$ for macroblock $MB_{r+d,k}$.

35. The method of claim 33 wherein, the hybrid video encoder only employs integer pixel motion compensated predictor without a loop filter.

36. The method of claim 35 wherein tracing the motion compensated predictor and generating the correction signal vector are performed on a pixel basis:

where two frame buffers, $g_{ix}$, $g_{iy}$, are used for tracing motion of each pixel from frame r+1 to r+d in x and y directions, respectively:
  A) in frame i, initializing two frame buffers as:
    where (m,n) is undamaged, setting $g_{rx}(m,n)=G$, and otherwise, setting $g_{rx}(m,n)=g_{ry}(m,n)=0$; where G is a flag which is outside the range of an x-direction motion vector;
  B) in each frame period i from r+1, a frame immediately following a damaged frame r, to r+d, the frame after the retransmitted data unit is received, for all pixels in frame i, accumulating a motion vector sum:
    B1) where pixel (m,n) is intra coded, then setting $g_{ix}(m,n)=G$;
    B2) else where a corresponding pixel in the previous frame has a G flag, i.e., $g_{(i-1)x}(m+v_{(i,k)y}, n+v_{(i,k)x})=G$, then setting $g_{ix}(m,n)=G$, where $v_{(i,k)x}$, $v_{(i,k)y}$ are motion vectors in horizontal and vertical directions for $MB_{(i,k)}$, which contains pixels (m,n);
    B3) else accumulating motion vector sums:

$$g_{ix}(m,n)=g_{ix}(m,n)+v_{(i,k)x}, \ g_{iy}(m,n)=g_{iy}(m,n)+v_{(i,k)y};$$

C) for all pixels (m,n) in the frame: generating the error correction signal for each pixel as follows:
    C1) where pixel (m,n) is of flag G, i.e., $g_{(r+d)x}(m,n)=G$, then setting $c_{r+d}(m,n)=0$;
    C2) else if pixel $(m+g_{(r+d)y}(m,n), n+g_{(r+d)x}(m,n))$ is intra coded in frame r, then setting $c_{r+d}(m,n)=y_r(m+g_{(r+d)y}(m,n), n+g_{(r+d)x}(m,n))-w_r(m,n)$;
    C3) otherwise, setting $c_{r+d}(m,n)=y_r(m+g_{(r+d)y}(m,n), n+g_{(r+d)x}(m,n))+b_{r-1}(m+v_{(r,k)y}+g_{(r+d)y}(m,n), n+v_{(r,k)x}+g_{(r+d)x}(m,n))-w_r(m,n)$.

37. The method of claim 26 wherein, the hybrid video encoder is one of: H2.61 and MPEG.

\* \* \* \* \*